(12) United States Patent
Morishima et al.

(10) Patent No.: US 11,396,145 B2
(45) Date of Patent: Jul. 26, 2022

(54) METHOD AND DEVICE FOR PRODUCING PULTRUDED MATERIAL

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masayuki Yamashita, Tokyo (JP); Hitoshi Ojika, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 375 days.

(21) Appl. No.: 16/305,219

(22) PCT Filed: Jun. 23, 2017

(86) PCT No.: PCT/JP2017/023178
§ 371 (c)(1),
(2) Date: Nov. 28, 2018

(87) PCT Pub. No.: WO2018/008431
PCT Pub. Date: Jan. 11, 2018

(65) Prior Publication Data
US 2020/0282673 A1    Sep. 10, 2020

(30) Foreign Application Priority Data

Jul. 6, 2016 (JP) .............................. JP2016-134523

(51) Int. Cl.
*B29C 70/52*    (2006.01)
*B29B 15/12*    (2006.01)
(Continued)

(52) U.S. Cl.
CPC .......... *B29C 70/521* (2013.01); *B29B 15/122* (2013.01); *B29C 70/56* (2013.01);
(Continued)

(58) Field of Classification Search
CPC ....... B29C 70/521; B29C 70/56; B29C 70/52; B29B 15/122; B29K 2101/10; B29K 2307/07; B29K 2309/08
See application file for complete search history.

(56) References Cited

U.S. PATENT DOCUMENTS

| | | | |
|---|---|---|---|
| 4,564,540 A | | 1/1986 | Davies et al. |
| 5,073,413 A | * | 12/1991 | Koppernaes .......... B29B 15/122 427/356 |

(Continued)

FOREIGN PATENT DOCUMENTS

| | | |
|---|---|---|
| CA | 2255524 A1 | 6/1999 |
| GB | 1080562 A | 8/1967 |

(Continued)

OTHER PUBLICATIONS

Extended European Search Report for European Application No. 17824038.8 dated Nov. 28, 2019; 14pp.

(Continued)

*Primary Examiner* — Matthew J Daniels
*Assistant Examiner* — Shibin Liang
(74) *Attorney, Agent, or Firm* — Hauptman Ham, LLP

(57) ABSTRACT

Provided are a method and a device for producing a pultruded material that improve the homogeneity of a thermosetting resin. The device for producing a pultruded material comprises a first opening section, a second opening section, a closing section, a tension-applying section, an impregnating section, and a mold. The first opening section and the second opening section open a bundle of reinforcing fibers and thereby obtain a bundle of reinforcing fibers. The (Continued)

closing section closes the bundle of opened reinforcing fibers and thereby obtains a bundle of reinforcing fibers. The tension-applying section applies tension along the direction in which the reinforcing fibers extend to the bundle of reinforcing fibers that pass through the closing section. The impregnating section impregnates the bundle of reinforcing fibers with a thermosetting resin. The mold pultrudes the bundle of reinforcing fibers that have been impregnated with the thermosetting resin.

6 Claims, 12 Drawing Sheets

(51) Int. Cl.
*B29C 70/56* (2006.01)
*B29K 101/10* (2006.01)
*B29K 307/04* (2006.01)
*B29K 309/08* (2006.01)

(52) U.S. Cl.
CPC ...... *B29K 2101/10* (2013.01); *B29K 2307/04* (2013.01); *B29K 2309/08* (2013.01)

(56) References Cited

U.S. PATENT DOCUMENTS

| | | | |
|---|---|---|---|
| 8,116,899 B1 | 2/2012 | Johnson et al. | |
| 10,538,015 B2 | 1/2020 | Pellet et al. | |
| 2005/0048273 A1* | 3/2005 | Ryan | B29C 70/52 428/297.4 |
| 2017/0334094 A1* | 11/2017 | Pellet | B29C 43/58 |
| 2018/0215110 A1* | 8/2018 | Kawabe | B29B 15/12 |

FOREIGN PATENT DOCUMENTS

| | | | | |
|---|---|---|---|---|
| JP | 04305439 A | | 10/1992 | |
| JP | H06254976 A | | 9/1994 | |
| JP | 2003292633 A | | 10/2003 | |
| JP | 2013026171 A | | 2/2013 | |
| JP | 5161604 B | * | 3/2013 | ............ D01F 9/22 |
| WO | 2009158262 A1 | | 12/2009 | |
| WO | 2016062896 A1 | | 4/2016 | |

OTHER PUBLICATIONS

International Search Report and Written Opinion for International Application No. PCT/JP2017/023178 dated Jul. 25, 2017; 14pp.
Office Action for Japanese Application No. 2016-134523 dated Mar. 10, 2020; 4pp.
A. Miller et al., "Impregnation Techniques for Thermoplastic Matrix Comoposites", Polymers & Polymer Composites, vol. 4, No. 7, 1996, pp. 459-481; 23pp.
Partial Search Report for European Application No. 17824038.8 dated Jun. 25, 2019; 12pp.
Extended European Search Report for International Application No. PCT/JP2017/023178 dated Nov. 28, 2019; 14pp.

* cited by examiner

METHOD AND DEVICE FOR PRODUCING PULTRUDED MATERIAL

RELATED APPLICATIONS

The present application is a National Phase of International Application Number PCT/JP2017/023178 filed Jun. 23, 2017 and claims priority to Japanese Application Number 2016-134523 filed Jul. 6, 2016.

TECHNICAL FIELD

The present invention relates to a method and a device for producing a pultruded material.

BACKGROUND ART

As a material that is lightweight and has a high strength, a composite material obtained by impregnating a thermosetting resin into a reinforced fiber is known. The composite material is used for aircraft, cars, ships, and the like. As a method for molding the composite material, a method for pultruding a base material of the composite material is known. A method for opening a reinforced fiber that is used in the base material of the composite material in order to improve the internal quality, strength characteristics, and the like of a pultruded material of the base material of the composite material is known (for example, PTL 1).

CITATION LIST

Patent Literature

[PTL 1] Japanese Unexamined Patent Application Publication No. 06-254976

SUMMARY OF INVENTION

Technical Problem

FIG. 17 is a schematic configurational view of a device 200 for producing a pultruded material of the related art. FIG. 18 is a schematic cross-sectional view of a pultruded material 210 that is produced using the device 200 for producing a pultruded material of the related art. The device 200 for producing a pultruded material which produces a pultruded material using a method of the related art including the method of PTL 1 includes a fiber supply section 202 that supplies a reinforced fiber, a resin pool 204 that impregnates a thermosetting resin into the reinforced fiber, and a mold 206 that pultrudes the reinforced fiber impregnated with the thermosetting resin as illustrated in FIG. 17. The device 200 for producing a pultruded material produces the pultruded material 210. The pultruded material 210 has a reinforced fiber 212 and a thermosetting resin 214. The pultruded material 210 is produced using the device 200 for producing a pultruded material, and thus the reinforced fiber 212 has a low straightness. Therefore, the homogeneity of the thermosetting resin 214 becomes low as illustrated in FIG. 18.

In the method of the related art including the method of PTL 1, the pultruded material 210 is produced using the device 200 for producing a pultruded material of the related art after the reinforced fiber that is used in the composite material base material is opened. Therefore, compared with a case in which the reinforced fiber 212 that is used in the composite material base material is not opened, the internal quality, strength characteristics, and the like of the pultruded material of the composite material base material improve. However, since the thermosetting resin 214 is impregnated into the reinforced fiber 212 in an opened state, the thermosetting resin 214 is not sufficiently opened, and thus expected straightness cannot be obtained, and there is a problem in that the internal quality, strength characteristics, and the like of the pultruded material of the composite material base material are not enough to be used for aircraft, cars, ships, and the like.

The present invention has been made in consideration of what has been described above, and an object of the present invention is to provide a method and a device for producing a pultruded material which are capable of improving the homogeneity of a thermosetting resin in a pultruded material being produced by pultruding a composite material base material.

Solution to Problem

In order to solve the above-described problem and achieve the object, a method for producing a pultruded material is a method for producing a pultruded material obtained by impregnating a thermosetting resin into reinforced fibers, the method including an opening step of opening a bundle of the reinforced fibers, a closing step of closing the bundle of the reinforced fibers opened in the opening step by narrowing at least any one of a width-direction length and a thickness-direction length under application of tension along a direction in which the reinforced fibers extend, an impregnating step of impregnating the thermosetting resin into the bundle of the reinforced fibers closed in the closing step, and a pultruding step of forming a pultruded material by pultruding the bundle of the reinforced fibers impregnated with the thermosetting resin in the impregnating step along the direction in which the reinforced fibers extend.

According to this configuration, the closing step of closing the bundle of the reinforced fibers opened in the opening step by narrowing at least any one of the width-direction length and the thickness-direction length under the application of tension along the direction in which the reinforced fibers extend is included, and thus it is possible to improve the straightness of the reinforced fiber, and it is possible to improve the homogeneity of the thermosetting resin being impregnated into the reinforced fiber in the subsequent impregnating step.

In this configuration, the opening step preferably includes a first opening step of opening the bundle of the reinforced fibers, and a second opening step of further opening the bundle of the reinforced fibers opened by the first opening step. According to this configuration, it is possible to remove torsion of the reinforced fibers and the opened state of the reinforced fibers by broadly opening the reinforced fibers, and thus it is possible to further improve the straightness of the reinforced fibers and further improve the homogeneity of the thermosetting resin being impregnated into the reinforced fibers in the subsequent impregnating step.

In this configuration including the first opening step and the second opening step, in the first opening step, the bundle of the reinforced fibers is preferably opened by at least any treatment of blowing of air, application of vibrations, and pressing of the bundle of the reinforced fibers into a rod-like member. In addition, in this configuration including the first opening step and the second opening step, in the second opening step, the bundle of the reinforced fibers is preferably further opened by at least any treatment of blowing of air, application of vibrations, pressing of the bundle of the reinforced fibers into a rod-like member, and passing of the bundle of the reinforced fibers through a comb-like section having teeth disposed in a direction intersecting the direction in which the reinforced fibers extend. Here, the second opening step preferably includes a treatment different from the first opening step. According to these configurations, it is possible to further improve the straightness of the reinforced fibers and further improve the homogeneity of the thermosetting resin being impregnated into the reinforced fibers in the subsequent impregnating step.

In these configurations, in the impregnating step, it is preferable that the bundle of the reinforced fibers is immersed in a resin pool filled with the thermosetting resin, and then a proportion of an amount of the impregnated thermosetting resin in the reinforced fibers is set to be constant under application of tension along the direction in which the reinforced fibers extend. Alternatively, in these configurations, in the impregnating step, the thermosetting resin is preferably uniformly applied to the bundle of the reinforced fibers by blowing. According to these configurations, it is possible to improve the homogeneity of the thermosetting resin being impregnated into the reinforced fibers in the impregnating step.

In these configurations, it is preferable to further include a vacuum deaeration step of deaerating the thermosetting resin by drawing a vacuum on a surrounding of the bundle of the reinforced fibers before the pultruding step is carried out on the bundle of the reinforced fibers impregnated with the thermosetting resin in the impregnating step. According to this configuration, it is possible to remove voids (air bubbles) in the thermosetting resin being impregnated into the bundle of the reinforced fibers and further improving the internal quality.

In these configurations, it is preferable to further include a tension adjustment step of adjusting tension by applying the tension along the direction in which the reinforced fibers extend before the pultruding step is carried out on the bundle of the reinforced fibers impregnated with the thermosetting resin in the impregnating step. According to this configuration, it is possible to further improve the straightness of the reinforced fibers and further improve the homogeneity of the thermosetting resin being impregnated into the reinforced fibers.

In addition, in order to solve the above-described problem and achieve the object, a method for producing a pultruded material is a method for producing a pultruded material obtained by impregnating a thermosetting resin into a reinforced fiber, the method including an impregnating step of uniformly impregnating the thermosetting resin into a sheet of the reinforced fiber by immersing the sheet of the reinforced fiber in a resin pool filled with the thermosetting resin and then setting a proportion of an amount of the impregnated thermosetting resin in the reinforced fiber to be constant under application of tension along a direction in which the reinforced fiber extends and a pultruding step of forming a pultruded material by pultruding the sheet of the reinforced fiber impregnated with the thermosetting resin in the impregnating step along the direction in which the reinforced fiber extends. Alternatively, in order to solve the above-described problem and achieve the object, a method for producing a pultruded material is a method for producing a pultruded material obtained by impregnating a thermosetting resin into a reinforced fiber, the method including an impregnating step of uniformly impregnating the thermosetting resin into a sheet of the reinforced fiber by uniformly applying the thermosetting resin to the sheet of the reinforced fiber by blowing and a pultruding step of forming a pultruded material by pultruding the sheet of the reinforced fiber impregnated with the thermosetting resin in the impregnating step along the direction in which the reinforced fiber extends.

According to this configuration in which the thermosetting resin is uniformly impregnated into the sheet of the reinforced fiber, the proportion of the thermosetting resin being impregnated into the reinforced fiber in the impregnating step is set to be constant even after the reinforced fiber is worked to a sheet shape, and thus it is possible to improve the homogeneity of the thermosetting resin being impregnated into the reinforced fiber.

According to this configuration in which the thermosetting resin is uniformly impregnated into the sheet of the reinforced fiber, it is preferable to further include a vacuum deaeration step of deaerating the thermosetting resin by drawing a vacuum on a surrounding of the sheet of the reinforced fiber before the pultruding step is carried out on the sheet of the reinforced fiber impregnated with the thermosetting resin in the impregnating step. According to this configuration, it is possible to remove voids (air bubbles) in the thermosetting resin being impregnated into the sheet of the reinforced fiber and further improving the internal quality.

In these configurations in which the thermosetting resin is uniformly impregnated into the sheet of the reinforced fiber, it is preferable to further include a tension adjustment step of adjusting tension by applying the tension along the direction in which the reinforced fibers extend before the pultruding step is carried out on the sheet of the reinforced fiber impregnated with the thermosetting resin in the impregnating step. According to this configuration, it is possible to further improve the straightness of the reinforced fibers even after the reinforced fiber is worked to a sheet shape, and it is possible to further improve the homogeneity of the thermosetting resin being impregnated into the reinforced fibers.

In addition, in order to solve the above-described problem and achieve the object, a device for producing a pultruded material is a device for producing a pultruded material obtained by impregnating a thermosetting resin into reinforced fibers, the device including an opening section that opens a bundle of the reinforced fibers, a closing section that includes a member having at least any of a width-direction length and a thickness-direction length gradually narrowed from an inlet through an outlet and closes the bundle of the reinforced fibers opened in the opening section, a tension-applying section that is provided downstream of the closing section and applies tension to the bundle of the reinforced fibers that passes through the closing section along a direction in which the reinforced fibers extend, an impregnating section that impregnates the thermosetting resin into the bundle of the reinforced fibers closed by the closing section, and a mold that forms a pultruded material by pultruding the bundle of the reinforced fibers impregnated with the thermosetting resin by the impregnating section along the direction in which the reinforced fibers extend.

According to this configuration, the closing section that closes the bundle of the reinforced fibers opened in the opening step and the tension-applying section that is provided downstream of the closing section and applies tension to the bundle of the reinforced fibers that passes through the closing section along the direction in which the reinforced fibers extend are included, and thus it is possible to improve the straightness of the reinforced fibers and improve the homogeneity of the thermosetting resin being impregnated into the reinforced fibers in the subsequent impregnating step.

In this configuration, the opening section preferably includes a first opening section that opens the bundle of the reinforced fibers and a second opening section that further opens the bundle of the reinforced fibers opened by the first opening section. According to this configuration, it is possible to remove torsion of the reinforced fibers and the opened state of the reinforced fibers by broadly opening the reinforced fibers, and thus it is possible to further improve the straightness of the reinforced fibers and further improve the homogeneity of the thermosetting resin being impregnated into the reinforced fibers in the subsequent impregnating step.

In this configuration including the first opening section and the second opening section, the first opening section preferably includes at least any of an air blowing section that blows air to the bundle of the reinforced fibers, a vibration application section that applies vibrations to the bundle of the reinforced fibers, and a rod-like pressing section that presses the bundle of the reinforced fibers into a rod-like member. In addition, in this configuration including the first opening section and the second opening section, the second opening section preferably includes at least any of an air blowing section that blows air to the bundle of the reinforced fibers, a vibration application section that applies vibrations to the bundle of the reinforced fibers, a rod-like pressing section that presses the bundle of the reinforced fibers into a rod-like member, and a comb-like section having teeth disposed in a direction intersecting the direction in which the reinforced fibers extend. Here, the second opening section preferably includes a treatment section that carries out a treatment different from that carried out by the first opening section. According to these configurations, it is possible to further improve the straightness of the reinforced fibers and further improve the homogeneity of the thermosetting resin being impregnated into the reinforced fibers in the subsequent impregnating step.

In these configurations, the impregnating section preferably includes a resin pool filled with the thermosetting resin in which the bundle of the reinforced fibers is immersed and a resin homogenization section that sets a proportion of an amount of the impregnated thermosetting resin in the reinforced fibers to be constant under application of tension along the direction in which the reinforced fibers extend. Furthermore, the resin homogenization section more preferably includes a first resin homogenization section including a mold having at least any of a width-direction length and a thickness-direction length gradually narrowed from an inlet through an outlet, and a second resin homogenization section including a pair of rolls that presses the bundle of the reinforced fibers in the thickness direction.

Alternatively, in these configurations, the impregnating section preferably includes a resin blowing section that uniformly applies the thermosetting resin to the bundle of the reinforced fibers by blowing. According to these configurations, it is possible to further improve the homogeneity of the thermosetting resin being impregnated into the reinforced fibers by the impregnating section.

In these configurations, it is preferable to further include a vacuum deaeration section that deaerates the thermosetting resin by drawing a vacuum on a surrounding of the bundle of the reinforced fibers before the bundle of the reinforced fibers impregnated with the thermosetting resin by the impregnating section is introduced into the mold. According to this configuration, it is possible to remove voids (air bubbles) in the thermosetting resin being impregnated into the bundle of the reinforced fibers and further improving the internal quality.

In these configurations, it is preferable to further include a tension adjustment section that adjusts tension by applying the tension along the direction in which the reinforced fibers extend before the bundle of the reinforced fibers impregnated with the thermosetting resin by the impregnating section is introduced into the mold. According to this configuration, it is possible to further improve the straightness of the reinforced fibers and further improve the homogeneity of the thermosetting resin being impregnated into the reinforced fibers.

In addition, in order to solve the above-described problem and achieve the object, a device for producing a pultruded material is a device for producing a pultruded material obtained by impregnating a thermosetting resin into a reinforced fiber, the device including a resin pool filled with the thermosetting resin in which a sheet of the reinforced fiber is immersed, a resin homogenization section that sets a proportion of an amount of the impregnated thermosetting resin in the reinforced fiber to be constant under application of tension along a direction in which the reinforced fiber extends, and a mold that forms a pultruded material by pultruding the sheet of the reinforced fiber impregnated with the thermosetting resin by the resin pool and the resin homogenization section along the direction in which the reinforced fiber extends. Furthermore, the resin homogenization section more preferably includes a first resin homogenization section including a mold having at least any of a width-direction length and a thickness-direction length gradually narrowed from an inlet through an outlet, and a second resin homogenization section including a pair of rolls that presses the bundle of the reinforced fibers in the thickness direction. Alternatively, in order to solve the above-described problem and achieve the object, a device for producing a pultruded material is a device for producing a pultruded material obtained by impregnating a thermosetting resin into a reinforced fiber, the device including a resin blowing section that uniformly applies the thermosetting resin to a sheet of the reinforced fiber by blowing and a mold that forms a pultruded material by pultruding the sheet of the reinforced fiber impregnated with the thermosetting resin by the resin blowing section along the direction in which the reinforced fiber extends.

According to these configurations, the proportion of the thermosetting resin being impregnated into the reinforced fiber by the impregnating section is set to be constant even after the reinforced fiber is worked to a sheet shape, and thus it is possible to improve the homogeneity of the thermosetting resin being impregnated into the reinforced fiber.

In these configurations, it is preferable to further include a vacuum deaeration section that deaerates the thermosetting resin by drawing a vacuum on a surrounding of the sheet of the reinforced fiber before the sheet of the reinforced fiber impregnated with the thermosetting resin by the impregnating section is introduced into the mold. According to this configuration, it is possible to remove voids (air bubbles) in the thermosetting resin being impregnated into the sheet of the reinforced fiber and further improving the internal quality.

In these configurations in which the thermosetting resin is uniformly impregnated into the sheet of the reinforced fiber, it is preferable to further include a tension adjustment section that adjusts tension by applying the tension along the direction in which the reinforced fiber extends before the sheet of the reinforced fiber impregnated with the thermosetting resin is introduced into the mold. According to this configuration, it is possible to improve the straightness of the reinforced fiber even after the reinforced fiber is worked to a sheet shape, and it is possible to further improve the homogeneity of the thermosetting resin being impregnated into the reinforced fiber.

Advantageous Effects of Invention

According to the present invention, it is possible to provide a method and a device for producing a pultruded material which are capable of improving the homogeneity of a thermosetting resin in a pultruded material being produced by pultruding a composite material base material.

DESCRIPTION OF EMBODIMENTS

Hereinafter, embodiments according to the present invention will be described in detail on the basis of drawings. Meanwhile, this invention is not limited by these embodiments. In addition, the scope of configurational elements in the embodiments include configurational elements that can be easily replaced by a person skilled in the art and substantially the same configurational elements. Furthermore, configurational elements described below can be appropriately combined together.

First Embodiment

Figure 1:
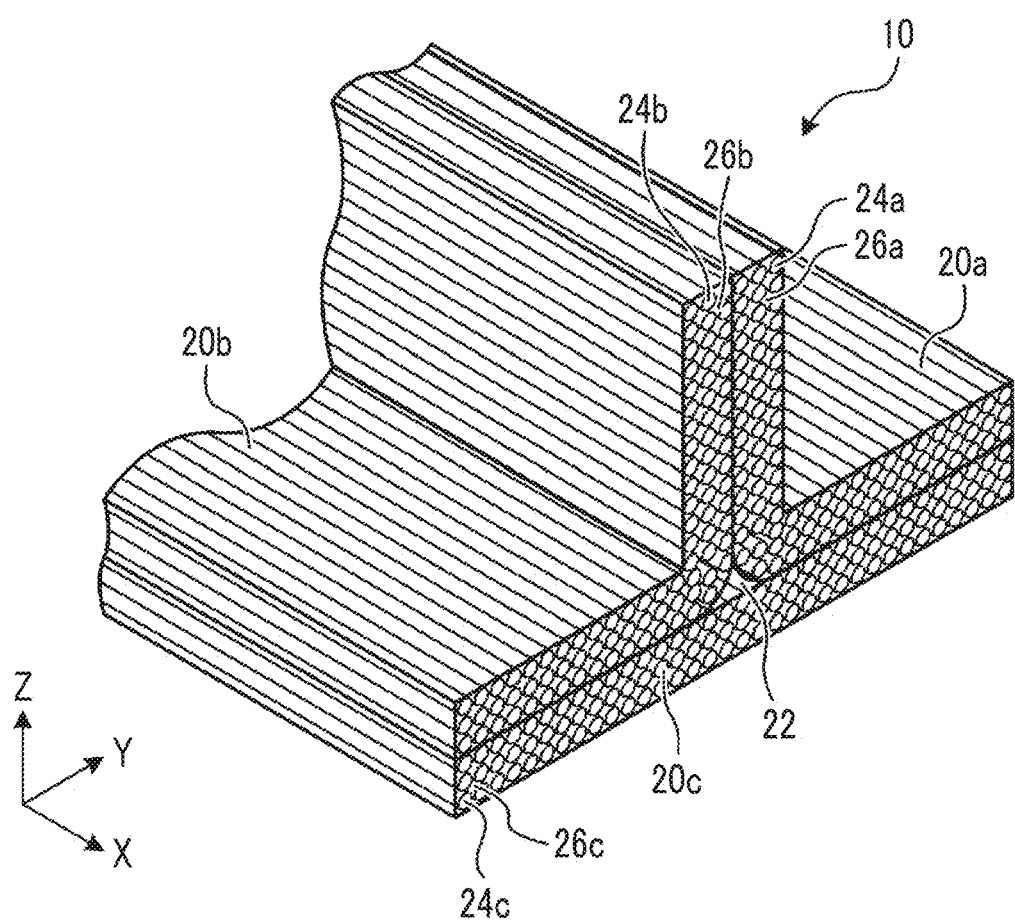
FIG. 1 is a schematic configurational view illustrating an example of a pultruded material being produced using a device for producing a pultruded material according to a first embodiment and a second embodiment of the present invention.
Figure 2:
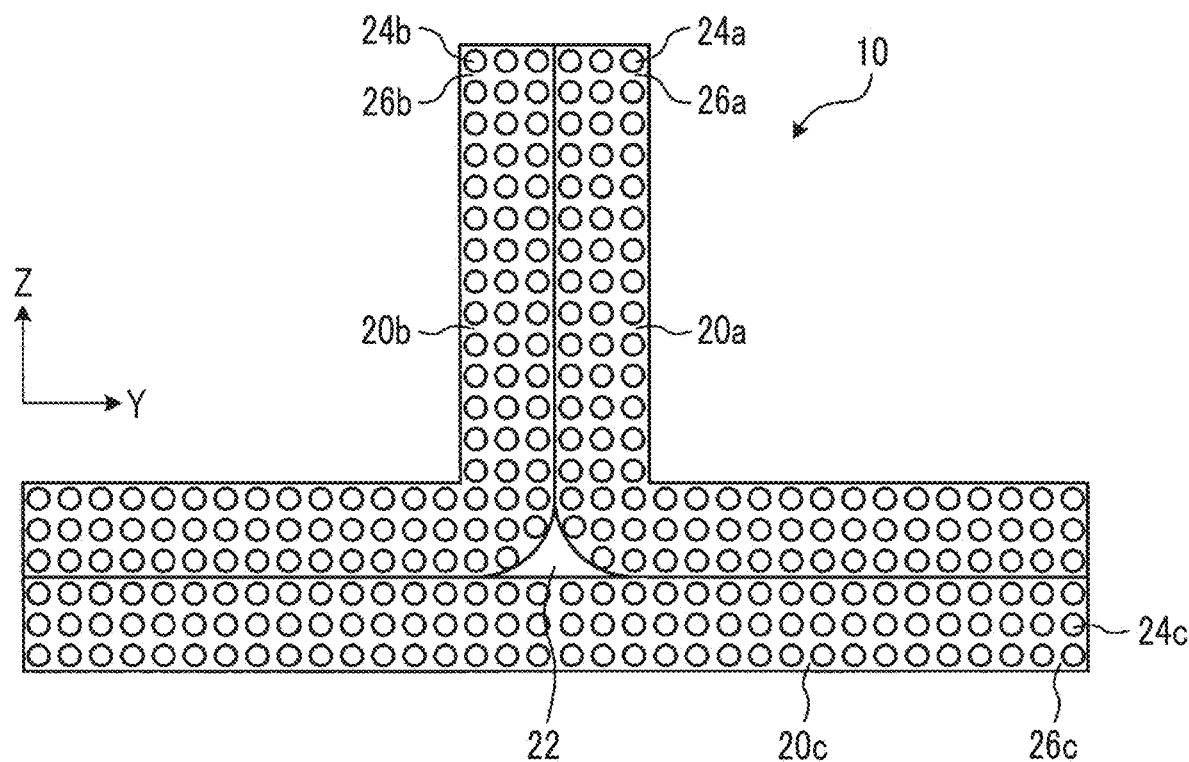
FIG. 2 is a schematic cross-sectional view of the pultruded material of FIG. 1.

FIG. 1 is a schematic configurational view illustrating a pultruded material 10 that is an example of a pultruded material being produced using a device for producing a pultruded material according to a first embodiment and a second embodiment of the present invention. FIG. 2 is a schematic cross-sectional view of the pultruded material 10 of FIG. 1. The pultruded material 10 is a material pultruded along a longitudinal direction that is an X-axis direction illustrated in FIG. 1 and has a shape extending in the X-axis direction. The pultruded material 10 has a predetermined shape in a YZ plane illustrated in FIG. 1, that is, a plane perpendicular to the longitudinal direction. The pultruded material 10 is formed in a T shape in the first embodiment and the second embodiment, but the shape is not limited thereto, and the pultruded material may also be formed in any shape of an I shape, an H shape, a U shape, a cylindrical shape, and the like.

The pultruded material 10 includes a plurality of composite material base materials 20a, 20b, and 20c and a gap material 22 as illustrated in FIG. 1 and FIG. 2. The plurality of composite material base materials 20a, 20b, and 20c has a sheet shape that extends along the X-axis direction and is worked by being deformed so as to become a predetermined shape in a YZ plane during pultruding. All of the composite material base materials 20a, 20b, and 20c are composite materials including reinforced fibers 24a, 24b, and 24c that extend along the X-axis direction and thermosetting resins 26a, 26b, and 26c impregnated into the reinforced fibers 24a, 24b, and 24c. The composite material base materials 20a, 20b, and 20c form composite material molded bodies pultruded to a predetermined shape. In the following description, in the case of being not differentiated from one another, the composite material base materials 20a, 20b, and 20c will be appropriately referred to as the composite material base material 20. In addition, in the following description, in the case of being not differentiated from one another, the reinforced fibers 24a, 24b, and 24c will be appropriately referred to as the reinforced fiber 24. In addition, in the following description, in the case of being not differentiated from one another, the thermosetting resins 26a, 26b, and 26c will be appropriately referred to as the thermosetting resin 26.

The reinforced fiber 24 has a higher straightness compared with the reinforced fiber 212 included in the pultruded material 210 of the related art. In addition, the thermosetting resin 26 has a higher homogeneity compared with the thermosetting resin 214 included in the pultruded material 210 of the related art. The homogeneity refers to an index indicating the degree of the uniformity of the proportion of the amount of the impregnated thermosetting resin to the reinforced fiber.

As the reinforced fiber 24, a bundle of approximately several hundreds to several thousands of basic fibers in a range of 5 μm or more and 7 μm or less is exemplified. As the basic fiber configuring the reinforced fiber 24, only a carbon fiber is exemplified. The basic fiber configuring the reinforced fiber 24 is not limited thereto and may be a plastic fiber, a glass fiber, or a metal fiber other than the carbon fiber. As the thermosetting resin 26, only an epoxy resin is exemplified. The thermosetting resin 26 is not limited thereto and may be a different thermosetting resin.

The thermosetting resin 26 may be in a softened state, a cured state, or a semi-cured state. The softened state refers to a state in which the thermosetting resin 26 is yet to be thermally cured. The softened state is a non-self-supportable state and a state in which the shape cannot be held in a case in which the thermosetting resin is not supported by a support. The softened state is a state in which the thermosetting resin 26 is heated and thus capable of undergoing a thermal curing reaction. The cured state refers to a state in which the thermosetting resin 26 has been thermally cured. The cured state is a self-supportable state and a state in which the shape can be held even in a case in which the thermosetting resin is not supported by a support. The cured state is a state in which the thermosetting resin 26 is not capable of undergoing a thermal curing reaction even when heated. The semi-cured state refers to a state between the softened state and the cured state. The semi-cured state is a state in which the thermosetting resin 26 has been thermally cured to an extent weaker than in the cured state. The semi-cured state is a self-supportable state and a state in which the shape can be held even in a case in which the thermosetting resin is not supported by a support. The semi-cured state is a state in which the thermosetting resin 26 is heated and thus capable of undergoing a thermal curing reaction. It is preferable that, during pultruding or after pultruding, the composite material base material 20 is subjected to a predetermined heating treatment and thus the thermosetting resin 26 is prepreg that is the semi-cured state or the thermosetting resin 26 is in the cured state.

The gap material 22 is disposed in a space among the plurality of pultruded composite material base materials 20a, 20b, and 20c, that is, a gap among composite material molded bodies. In the first embodiment and the second embodiment, as the gap material 22, a noodle-like filler formed by bundling prepreg obtained by impregnating a resin into a reinforced fiber such as a carbon fiber is exemplified, but the present invention is not limited thereto, and the gap material may be a material obtained by combining a different reinforced fiber and the thermosetting resin.

Figure 3:
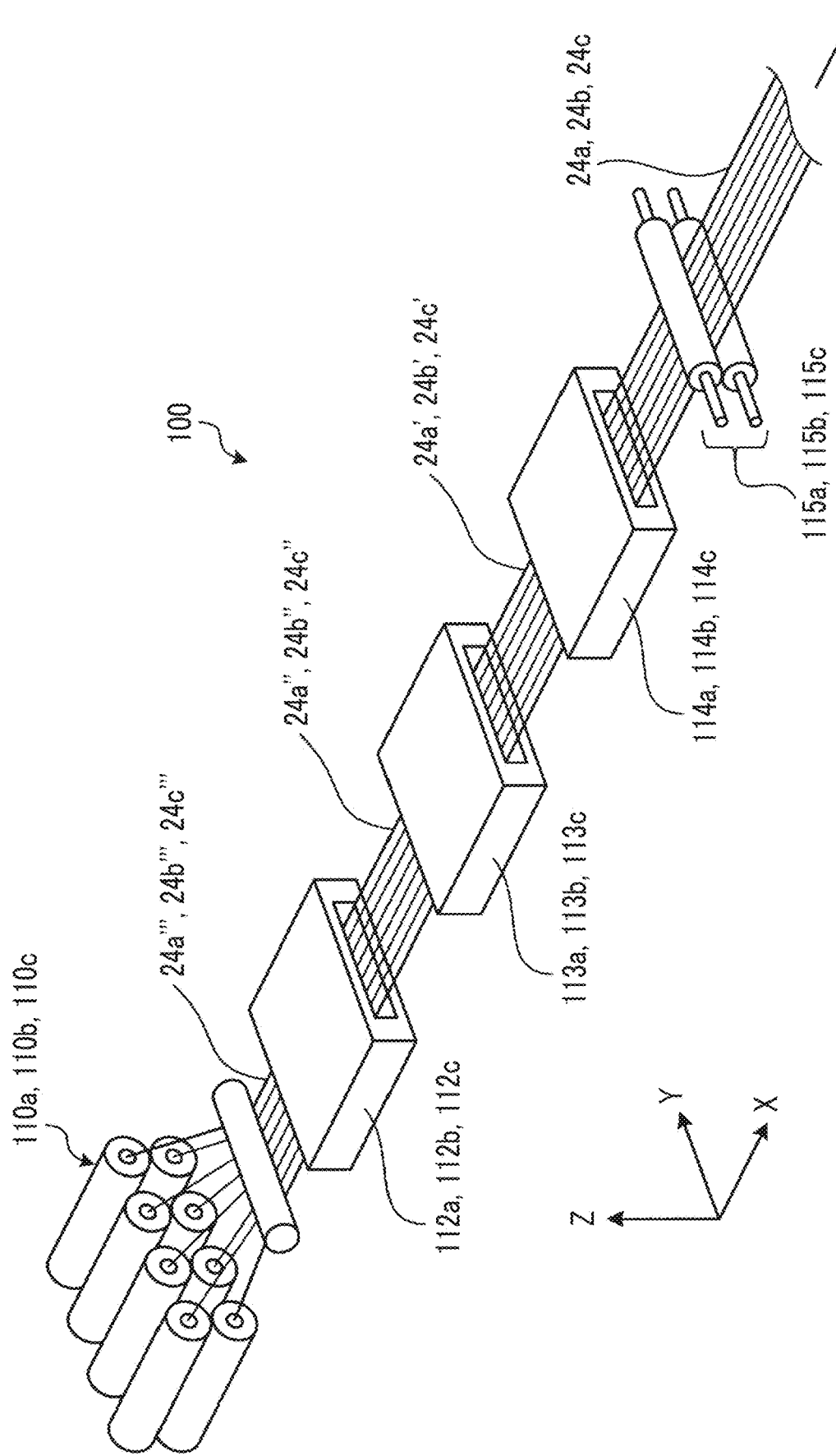
FIG. 3 is a schematic configurational view of a part of an example of a device for producing a pultruded material according to the first embodiment.
Figure 4:
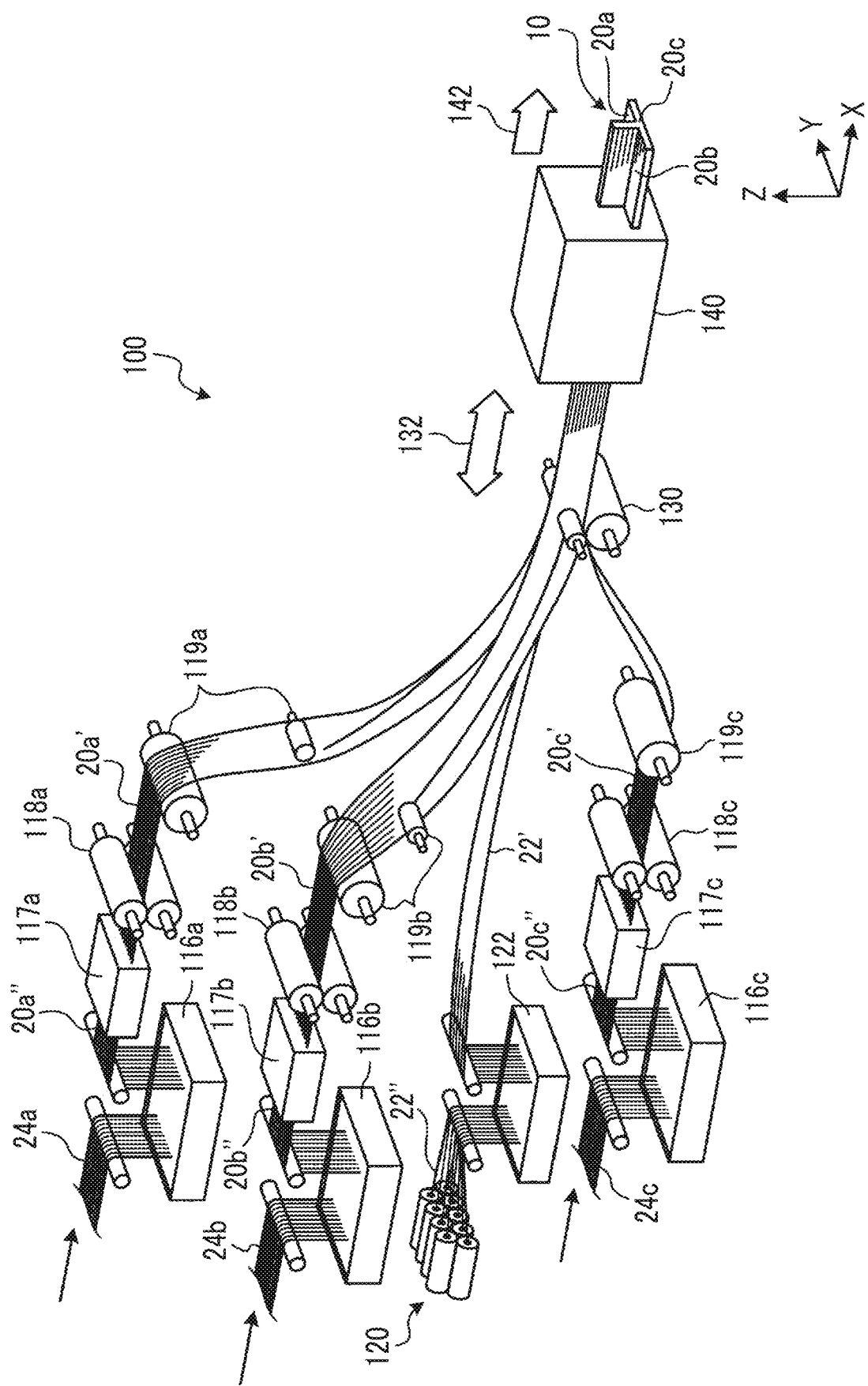
FIG. 4 is a schematic configurational view of a part of an example of the device for producing a pultruded material according to the first embodiment.

FIG. 3 is a schematic configurational view of a part of a device 100 for producing a pultruded material which is an example of the device for producing a pultruded material according to the first embodiment. FIG. 4 is a schematic configurational view of a part of the device 100 for producing a pultruded material which is an example of the device for producing a pultruded material according to the first embodiment. As illustrated in FIG. 3 and FIG. 4, the device 100 for producing a pultruded material includes fiber supply sections 110a, 110b, and 110c, first opening sections 112a, 112b, and 112c, second opening sections 113a, 113b, and 113c, closing sections 114a, 114b, and 114c, tension-applying sections 115a, 115b, and 115c, resin pools 116a, 116b, and 116c, first resin homogenization sections and vacuum deaeration sections 117a, 117b, and 117c, second resin homogenization sections 118a, 118b, and 118c, molding rollers 119a, 119b, and 119c, a gap base material supply section 120, a resin pool 122, a tension adjustment section 130, and a mold 140. All of the first resin homogenization sections and vacuum deaeration sections 117a, 117b, and 117c include a first resin homogenization section and a vacuum deaeration section 117p (refer to FIG. 13) adjacently provided immediately downstream thereof.

The fiber supply section 110a, the first opening section 112a, the second opening section 113a, the closing section 114a, the tension-applying section 115a, the resin pool 116a, the first resin homogenization section and vacuum deaeration section 117a, the second resin homogenization section 118a, and the molding roller 119a are a series of devices for introducing the composite material base material 20a' which serves as a source of the composite material base material 20a into the mold 140. The fiber supply section 110a supplies a bundle of reinforced fibers 24a''' which serve as a source of the reinforced fiber 24a of the composite material base material 20a along the X-axis direction. The first opening section 112a opens the bundle of the reinforced fibers 24a''' and thus produces a bundle of reinforced fibers 24a''. The second opening section 113a opens the bundle of the reinforced fibers 24a'' and thus produces a bundle of reinforced fibers 24a'. The closing section 114a closes the bundle of the reinforced fibers 24a' and thus produces a bundle of reinforced fibers 24a. The tension-applying section 115a applies tension to the bundle of the reinforced fibers 24a' which passes through the closing section 114a. The resin pool 116a is a pool retaining the thermosetting resin 26a, the bundle of the reinforced fibers 24a is immersed in the resin pool, thereby impregnating the thermosetting resin 26a into the bundle of the reinforced fibers 24a and forming a composite material base material 20a'' in which the reinforced fibers 24a extend in the X-axis direction. The first resin homogenization section and vacuum deaeration section 117a and the second resin homogenization section 118a set the proportion of the amount of the impregnated thermosetting resin 26a in the reinforced fiber 24a in the composite material base material 20a'' to be constant and removes voids (air bubbles) in the thermosetting resin 26a, thereby producing a composite material base material 20a'. The molding roller 119a deforms the composite material base material 20a' so as to have a predetermined shape in the YZ plane and thus introduces the composite material base material into the tension adjustment section 130.

The fiber supply section 110b, the first opening section 112b, the second opening section 113b, the closing section 114b, the tension-applying section 115b, the resin pool 116b, the first resin homogenization section and vacuum deaeration section 117b, the second resin homogenization section 118b, and the molding roller 119b are a series of devices for introducing the composite material base material 20b' which serves as a source of the composite material base material 20b into the mold 140. The fiber supply section 110b supplies a bundle of reinforced fibers 24b''' which serve as a source of the reinforced fiber 24b of the composite material base material 20b along the X-axis direction. The first opening section 112b opens the bundle of the reinforced fibers 24b''' and thus produces a bundle of reinforced fibers 24b''. The second opening section 113b opens the bundle of the reinforced fibers 24b'' and thus produces a bundle of reinforced fibers 24b'. The closing section 114b closes the bundle of the reinforced fibers 24b' and thus produces a bundle of reinforced fibers 24b. The tension-applying section 115b applies tension to the bundle of the reinforced fibers 24b' which passes through the closing section 114b. The resin pool 116b is a pool retaining the thermosetting resin 26b, the bundle of the reinforced fibers 24b is immersed in the resin pool, thereby impregnating the thermosetting resin 26b into the bundle of the reinforced fibers 24b and forming a composite material base material 20b'' in which the reinforced fibers 24b extend in the X-axis direction. The first resin homogenization section and vacuum deaeration section 117b and the second resin homogenization section 118b set the proportion of the amount of the impregnated thermosetting resin 26b in the reinforced fiber 24b in the composite material base material 20b'' to be constant and removes voids (air bubbles) in the thermosetting resin 26b, thereby producing a composite material base material 20b'. The molding roller 119b deforms the composite material base material 20b' so as to have a predetermined shape in the YZ plane and thus introduces the composite material base material into the tension adjustment section 130.

The fiber supply section 110c, the first opening section 112c, the second opening section 113c, the closing section 114c, the tension-applying section 115c, the resin pool 116c, the first resin homogenization section and vacuum deaeration section 117c, the second resin homogenization section 118c, and the molding roller 119c are a series of devices for introducing the composite material base material 20c' which serves as a source of the composite material base material 20c into the mold 140. The fiber supply section 110c supplies a bundle of reinforced fibers 24c''' which serve as a source of the reinforced fiber 24c of the composite material base material 20c along the X-axis direction. The first opening section 112c opens the bundle of the reinforced fibers 24c''' and thus produces a bundle of reinforced fibers 24c''. The second opening section 113c opens the bundle of the reinforced fibers 24c'' and thus produces a bundle of reinforced fibers 24c'. The closing section 114c closes the bundle of the reinforced fibers 24c' and thus produces a bundle of reinforced fibers 24c. The tension-applying section 115c applies tension to the bundle of the reinforced fibers 24c' which passes through the closing section 114c. The resin pool 116c is a pool retaining the thermosetting resin 26c, the bundle of the reinforced fibers 24c is immersed in the resin pool, thereby impregnating the thermosetting resin 26c into the bundle of the reinforced fibers 24c and forming a composite material base material 20c'' in which the reinforced fibers 24c extend in the X-axis direction. The first resin homogenization section and vacuum deaeration section 117c and the second resin homogenization section 118c set the proportion of the amount of the impregnated thermosetting resin 26c in the reinforced fiber 24c in the composite material base material 20c'' to be constant and removes voids (air bubbles) in the thermosetting resin 26c, thereby producing a composite material base material 20c'. The molding roller 119c deforms the composite material base material 20c' so as to have a predetermined shape in the YZ plane and thus introduces the composite material base material into the tension adjustment section 130.

In the following description, in the case of being not differentiated from one another, the composite material base materials 20a'', 20b'', and 20c'' will be appropriately referred to as the composite material base material 20''. In addition, in the following description, in the case of being not differentiated from one another, the composite material base materials 20a', 20b', and 20c' will be appropriately referred to as the composite material base material 20'. In addition, in the following description, in the case of being not differentiated from one another, the reinforced fibers 24a''', 24b''', and 24c''' will be appropriately referred to as the reinforced fiber 24'''. In addition, in the following description, in the case of being not differentiated from one another, the reinforced fibers 24a'', 24b'', and 24c'' will be appropriately referred to as the reinforced fiber 24''. In addition, in the following description, in the case of being not differentiated from one another, the reinforced fibers 24a', 24b', and 24c' will be appropriately referred to as the reinforced fiber 24'.

In the following description, in the case of being not differentiated from one another, the fiber supply sections 110a, 110b, and 110c will be appropriately referred to as the fiber supply section 110. In addition, in the following description, in the case of being not differentiated from one another, the first opening sections 112a, 112b, and 112c will be appropriately referred to as the first opening section 112. In addition, in the following description, in the case of being not differentiated from one another, the second opening sections 113a, 113b, and 113c will be appropriately referred to as the second opening section 113. In addition, in the following description, in the case of being not differentiated from one another, the closing sections 114a, 114b, and 114c will be appropriately referred to as the closing section 114. In addition, in the following description, in the case of being not differentiated from one another, the tension-applying sections 115a, 115b, and 115c will be appropriately referred to as the tension-applying section 115. In addition, in the following description, in the case of being not differentiated from one another, the resin pools 116a, 116b, and 116c will be appropriately referred to as the resin pool 116. In addition, in the following description, in the case of being not differentiated from one another, the first resin homogenization sections and vacuum deaeration sections 117a, 117b, and 117c will be appropriately referred to as the first resin homogenization section and vacuum deaeration section 117. In addition, in the following description, in the case of being not differentiated from one another, the second resin homogenization sections 118a, 118b, and 118c will be appropriately referred to as the second resin homogenization section 118. In addition, in the following description, in the case of being not differentiated from one another, the molding rollers 119a, 119b, and 119c will be appropriately referred to as the molding roller 119.

The gap base material supply section 120 and the resin pool 122 are a series of devices for introducing a gap material 22' which serves as a source of the gap material 22 to the mold 140. The gap base material supply section 120 supplies an indirect base material 22'' that is a reinforced fiber which serves as a source of a reinforced fiber of the gap material 22. In the resin pool 122, the thermosetting resin is impregnated into the indirect base material 22'', and the gap material 22' is formed.

The tension adjustment section 130 applies tension to the composite material base material 20' and the gap material 22' along a direction in which the reinforced fiber 24 extends, that is, the X-axis direction indicated by an arrow 132 before the composite material base material 20' and the gap material 22' deformed by the molding roller 119 and the like so as to have a predetermined shape in a YZ plane are introduced into the mold 140. The tension adjustment section 130 applies tension to the composite material base material 20' and the gap material 22' along the direction in which the reinforced fiber 24 extends before the composite material base material 20' and the gap material 22' are introduced into the mold 140, thereby adjusting the tension applied to the composite material base material 20' and the gap material 22' in the direction in which the reinforced fiber 24 extends during the introduction into the mold 140.

The composite material base material 20' and the gap material 22' for which the tension being applied in the direction in which the reinforced fiber 24 extends is adjusted using the tension adjustment section 130 are introduced into the mold 140. The mold 140 pultrudes the composite material base material 20' and the gap material 22' that are introduced from the respective series of devices. The composite material base material 20' and the gap material 22' are pultruded and worked along a direction of an arrow 142.

The direction of the arrow 132 is preferably along the direction of the arrow 142. In this case, the tension adjustment section 130 adjusts tension by applying the tension in a pultruding direction, and thus it is possible to further improve the straightness of the reinforced fiber 24 and the homogeneity of the thermosetting resin 26.

It is preferable that the mold 140 has a heating section and causes the thermosetting resin 26 and the like included in the composite material base material 20' and the gap material 22' to be in the semi-cured state or the cured state. Alternatively, it is preferable that the mold has heating sections respectively between the resin pool 116 and the mold 140 and between the resin pool 122 and the mold 140 and causes the thermosetting resin 24 and the like included in the composite material base material 20' and the gap material 22' to be in the semi-cured state or the cured state.

Figure 5:
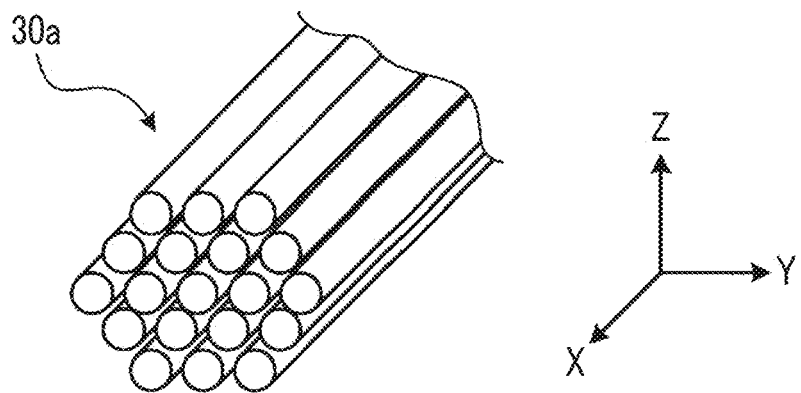
FIG. 5 is a perspective view illustrating an example of a bundle of reinforced fibers that is used in the device for producing a pultruded material according to the first embodiment.
Figure 6:
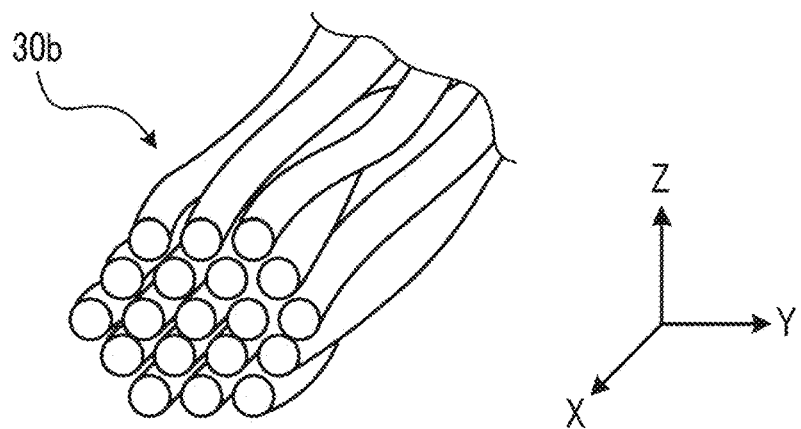
FIG. 6 is a perspective view illustrating an example of a bundle of the reinforced fibers that is used in the device for producing a pultruded material according to the first embodiment.
Figure 7:
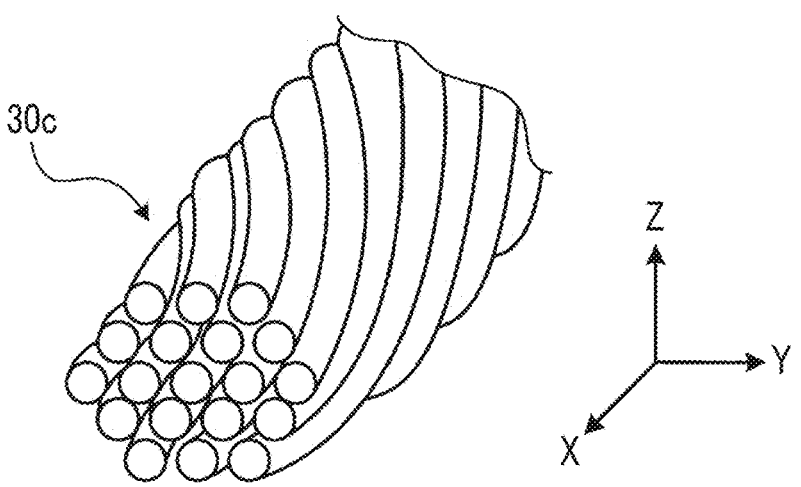
FIG. 7 is a perspective view illustrating an example of a bundle of the reinforced fibers that is used in the device for producing a pultruded material according to the first embodiment.

FIG. 5 is a perspective view illustrating a bundle 30*a* of reinforced fibers which is an example of the bundle of the reinforced fibers 24''' that is used in the device for producing a pultruded material according to the first embodiment. FIG. 6 is a perspective view illustrating a bundle 30*b* of reinforced fibers which is an example of the bundle of the reinforced fibers 24''' that is used in the device for producing a pultruded material according to the first embodiment. FIG. 7 is a perspective view illustrating a bundle 30*c* of reinforced fibers which is an example of the bundle of the reinforced fibers 24''' that is used in the device for producing a pultruded material according to the first embodiment. In all of the bundle 30*a* of reinforced fibers, the bundle 30*b* of reinforced fibers, and the bundle 30*c* of reinforced fibers, tows extend along the X-axis direction, and the cross-sectional direction of the tows is along a YZ plane direction. The bundle 30*a* of reinforced fibers, the bundle 30*b* of reinforced fibers, and the bundle 30*c* of reinforced fibers are all along the direction in which the tows extend, that is, the X-axis direction and are supply from the fiber supply section 110. As illustrated in FIG. 5, the bundle 30*a* of reinforced fibers is in a normal state in which there is no irregularity in the tow and no irregularity among all of the tows. In the bundle 30*b* of reinforced fibers, as illustrated in FIG. 6, there is no irregularity among all of the tows, but there is irregularity in the tow. In the bundle 30*c* of reinforced fibers, as illustrated in FIG. 7, there is irregularity among all of the tows.

The pultruded material 10 is ideally produced using the bundle 30*a* of reinforced fibers; however, an actual bundle of reinforced fibers 24''' often have irregularity as illustrated for the bundle 30*b* of reinforced fibers and the bundle 30*c* of reinforced fibers. In the device 100 for producing a pultruded material according to the first embodiment and the method for producing a pultruded material according to the first embodiment, even in a case in which the bundle of the reinforced fibers 24''' being used has irregularity as illustrated for the bundle 30*b* of reinforced fibers and the bundle 30*c* of reinforced fibers, an opening treatment and a closing treatment are carried out on the bundle of the reinforced fibers 24''' as described below, and thus it is possible to produce the pultruded material 10 including the reinforced fibers 24 having an improved straightness and the thermosetting resin 26 having an improved homogeneity.

The bundle of the reinforced fibers 24''' supplied from the fiber supply section 110 is subjected to a first opening treatment by the first opening section 112 and turned into the bundle of the reinforced fibers 24''. In the first embodiment, the first opening section 112 includes at least any of an air blowing section that blows the air to the bundle of the reinforced fibers 24''', a vibration application section that applies vibrations to the bundle of the reinforced fibers 24''', and a rod-like pressing section that presses the bundle of the reinforced fibers 24''' into a rod-like member. In the first embodiment, the first opening treatment using the first opening section 112 includes at least any treatment of a treatment for opening the bundle of the reinforced fibers 24''' by blowing the air, a treatment for opening the bundle of the reinforced fibers 24''' by applying vibrations, and a treatment for opening the bundle of the reinforced fibers 24''' by pressing the bundle of the reinforced fibers into the rod-like member. Meanwhile, the first opening section 112 and the first opening treatment using the first opening section 112 are not limited thereto, and it is also possible to use any well-known opening device and any well-known opening treatment method.

Figure 8:
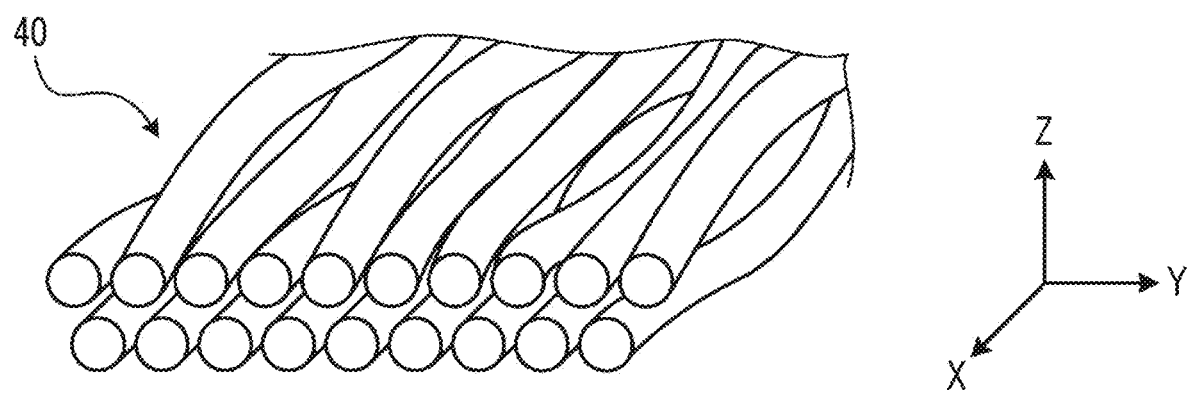
FIG. 8 is a perspective view illustrating an example of a bundle of reinforced fibers on which a first opening treatment has been carried out.

FIG. 8 is a perspective view illustrating a bundle 40 of reinforced fibers which is an example of the bundle of the reinforced fibers 24'' on which the first opening treatment has been carried out. In the bundle 40 of reinforced fibers, as illustrated in FIG. 8, the reinforced fibers 24'' extend along the X-axis direction, and a cross-sectional direction is along the YZ plane direction. Compared with the bundle 30*a* of reinforced fibers, the bundle 30*b* of reinforced fibers, and the bundle 30*c* of reinforced fibers, the bundle 40 of reinforced fibers is in a state in which the reinforced fibers 24'' are opened in a Y direction which is the horizontal direction. The bundle 40 of reinforced fibers is transported along the X-axis direction from the first opening section 112 to the second opening section 113. The bundle 40 of reinforced fibers is in a state in which torsion slightly remains in the reinforced fibers 24''. In a case in which the first opening treatment is carried out on bundles having irregularity as illustrated for the bundle 30*b* of reinforced fibers and the bundle 30*c* of reinforced fibers, there are cases in which a state in which torsion slightly remains in the reinforced fibers 24'' is formed as in the bundle 40 of reinforced fibers.

The bundle of the reinforced fibers 24'' on which the first opening treatment has been carried out using the first opening section 112 is subjected to a second opening treatment by the second opening section 113 and turned into the bundle of the reinforced fibers 24'. In the first embodiment, the second opening section 113 includes at least any of an air blowing section that blows the air to the bundle of the reinforced fibers 24'', a vibration application section that applies vibrations to the bundle of the reinforced fibers 24'', a rod-like pressing section that presses the bundle of the reinforced fibers 24'' into a rod-like member, and a comb-like section having teeth disposed in a direction intersecting the direction in which the reinforced fibers 24'' extend, for example, the vertical direction as a preferred direction. Here, the second opening section 113 preferably includes a treatment section that carries out a treatment different from that carried out by the first opening section 112. In the second opening section 113, in the case of the comb-like section, the sizes of a number of teeth are preferably smaller since it is possible to further open the bundle of the reinforced fibers 24". In order to decrease the sizes of the teeth of the comb-like section, strings may be used as the teeth of the comb-like section. In the first embodiment, the second opening treatment using the second opening section 113 is a treatment in which the bundle of the reinforced fibers 24" is passed through the comb-like section having the teeth disposed in a direction intersecting the direction in which the reinforced fibers 24" extend, for example, the vertical direction as a preferred direction, thereby further opening the bundle of the reinforced fibers 24". Meanwhile, the second opening section 113 and the second opening treatment using the second opening section 113 are not limited thereto, and it is also possible to use any well-known opening device and any well-known opening treatment method.

Figure 9:
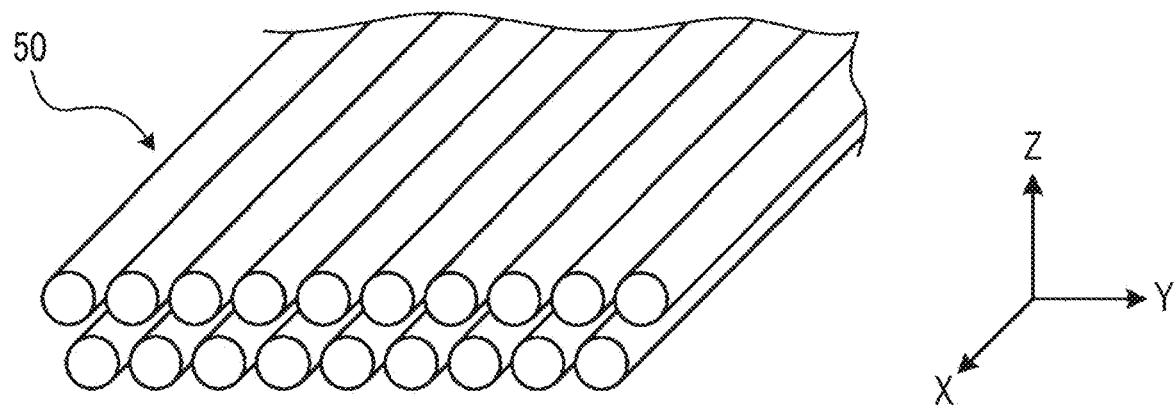
FIG. 9 is a perspective view illustrating an example of a bundle of reinforced fibers on which the first opening treatment and a second opening treatment have been carried out.

FIG. 9 is a perspective view illustrating a bundle 50 of reinforced fibers which is an example of the bundle of the reinforced fibers 24' on which the first opening treatment and the second opening treatment are carried out. In the bundle 50 of reinforced fibers, as illustrated in FIG. 9, the reinforced fibers 24' extend along the X-axis direction, and a cross-sectional direction is along the YZ plane direction. Compared with the bundle 40 of reinforced fibers, the bundle 50 of reinforced fibers is in a state in which the reinforced fibers 24' are further opened in the Y direction which is the horizontal direction. The bundle 50 of reinforced fibers is transported along the X-axis direction from the second opening section 113 to the closing section 114. The bundle 50 of reinforced fibers is in a state in which torsion rarely remains in the reinforced fibers 24'. When the first opening treatment and the second opening treatment are carried out on bundles having irregularity as illustrated for the bundle 30b of reinforced fibers and the bundle 30c of reinforced fibers, a state in which torsion rarely remains in the reinforced fibers 24' is formed as in the bundle 50 of reinforced fibers.

Figure 10:
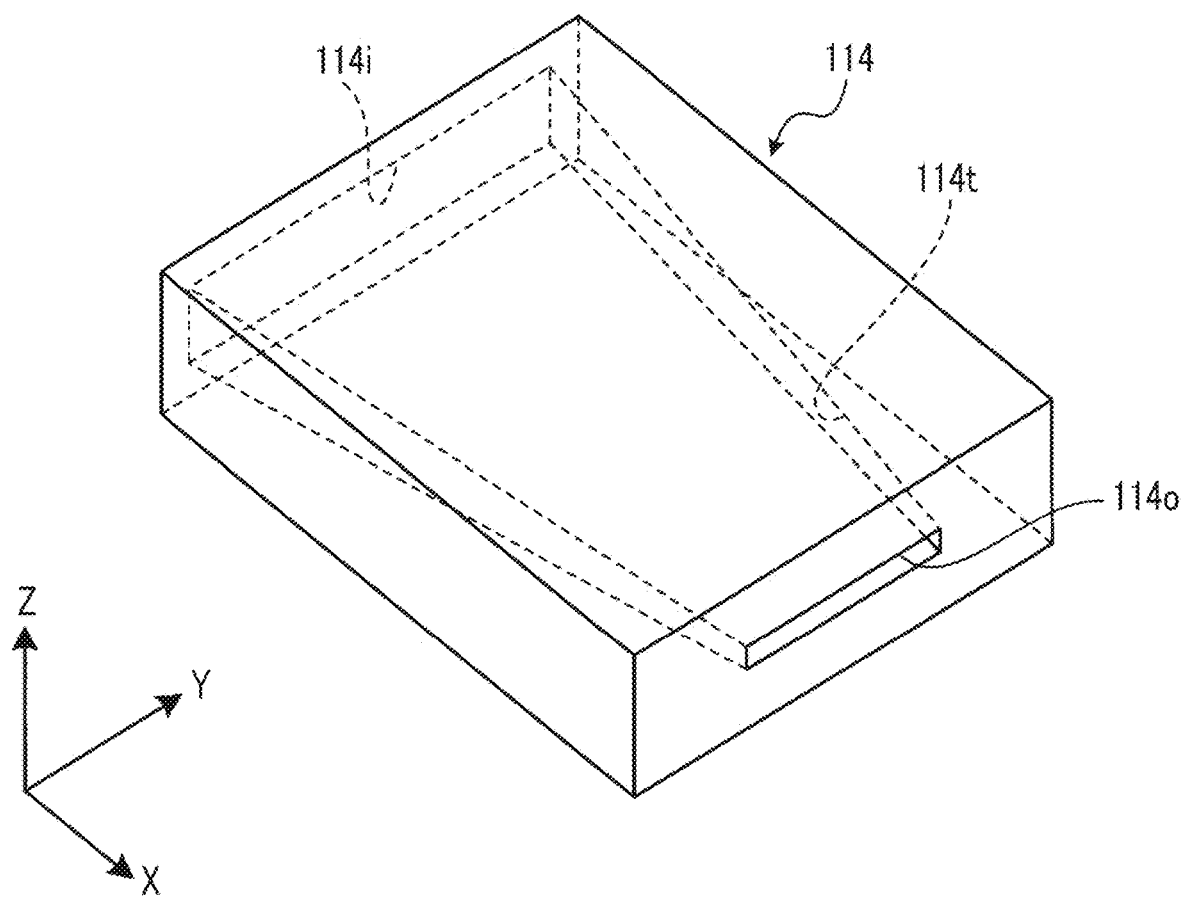
FIG. 10 is a schematic configurational view of an example of a closing section included in the device for producing a pultruded material of FIG. 3 and FIG. 4.

The bundle of the reinforced fibers 24' on which the first opening treatment and the second opening treatment have been carried out using the first opening section 112 and the second opening section 113 is subjected to the closing treatment by the closing section 114 and the tension-applying section 115 and turned into the bundle of the reinforced fibers 24. FIG. 10 is a schematic configurational view of the closing section 114 which is an example of the closing section included in the device 100 for producing a pultruded material of FIG. 3 and FIG. 4. The closing section 114 includes a member having at least any of a width-direction length which is along the Y-axis direction and a thickness-direction length which is along a Z-axis direction gradually narrowed from an inlet through an outlet. In detail, as illustrated in FIG. 10, the closing section 114 includes an inlet 114i, an outlet 114o, and a tapered inner circumferential surface 114t. The inlet 114i is an introduction opening into which the bundle of the reinforced fiber 24' on which the closing treatment is yet to be carried out is introduced. The outlet 114o is a discharging opening from which the bundle of the reinforced fiber 24 on which the closing treatment has been carried out is discharged. The tapered inner circumferential surface 114t is a surface having a width-direction length and a thickness-direction length both being gradually narrowed from the inlet 114i through the outlet 114o. The tapered inner circumferential surface 114t treats the bundle of the reinforced fibers 24' to be closed by squeezing gaps among the reinforced fibers 24' in the bundle of the reinforced fibers 24'. In the first embodiment, the tapered inner circumferential surface 114t has a width-direction length and a thickness-direction length both being uniformly narrowed, but the present invention is not limited thereto, both the width-direction length and the thickness-direction length may be unevenly narrowed, or the width-direction length and the thickness-direction length may include a constant place.

As illustrated in FIG. 3, the tension-applying section 115 is provided in a place in a +X-axis direction from the closing section 114, that is, downstream of the closing section 114. The tension-applying section 115 applies tension to the bundle of the reinforced fibers 24 along the X-axis direction which is the direction in which the reinforced fibers 24 extend downstream of the closing section 114, thereby applying tension to the bundle of the reinforced fibers 24' which passes through the closing section 114 along the X-axis direction which is the direction in which the reinforced fibers 24' extend. As the tension-applying section 115, a pair of rollers are exemplified. The tension-applying section 115 sandwiches the bundle of the reinforced fibers 24 in a thickness direction which is the Z-axis direction using a pair of rollers and sends the bundle of the reinforced fibers 24 in the +X-axis direction, thereby applying tension to the bundle of the reinforced fibers 24 along the X-axis direction which is the direction in which the reinforced fibers 24 extend.

Figure 11:
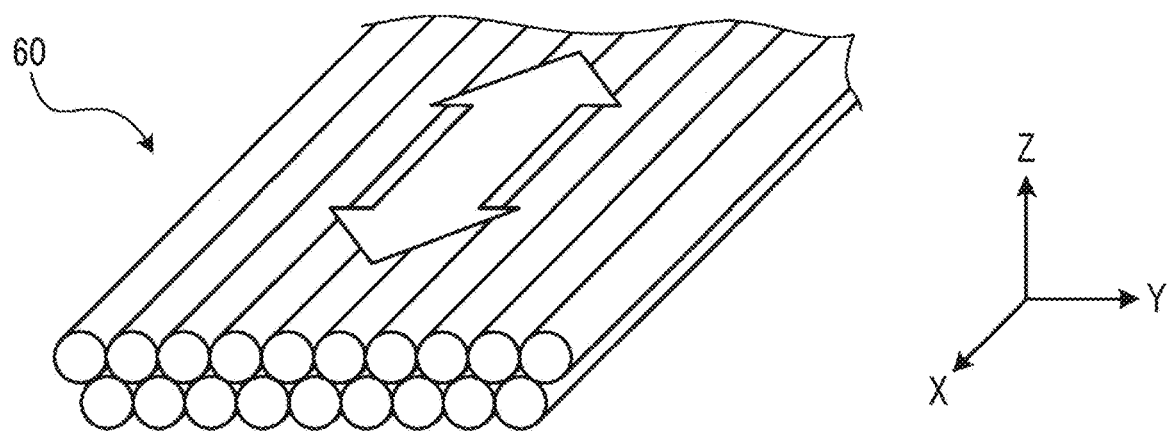
FIG. 11 is a perspective view illustrating an example of a bundle of reinforced fibers on which a closing treatment has been carried out.

FIG. 11 is a perspective view illustrating a bundle 60 of reinforced fibers which is an example of the bundle of the reinforced fibers 24 on which the closing treatment has been carried out. In the bundle 60 of reinforced fibers, as illustrated in FIG. 11, the reinforced fibers extend along the X-axis direction, and a cross-sectional direction is along the YZ plane direction. Compared with the bundle 50 of reinforced fibers, the bundle 60 of reinforced fibers is in a state in which the reinforced fibers 24 are closed in the Y direction which is the horizontal direction and the reinforced fibers 24 are arrayed with gaps among them squeezed. The bundle 60 of reinforced fibers is transported along the X-axis direction from the closing section 114 to the resin pool 116. The bundle 60 of reinforced fibers is in a state in which tension is applied in a direction along the X-axis direction of the reinforced fibers 24. When the first opening treatment, the second opening treatment, and the closing treatment are carried out on bundles having irregularity as illustrated for the bundle 30b of reinforced fibers and the bundle 30c of reinforced fibers, a state in which the reinforced fibers 24 are closed in the Y direction which is the horizontal direction and the reinforced fibers 24 are arrayed with gaps among them filled is formed as in the bundle 60 of reinforced fibers.

Figure 12:
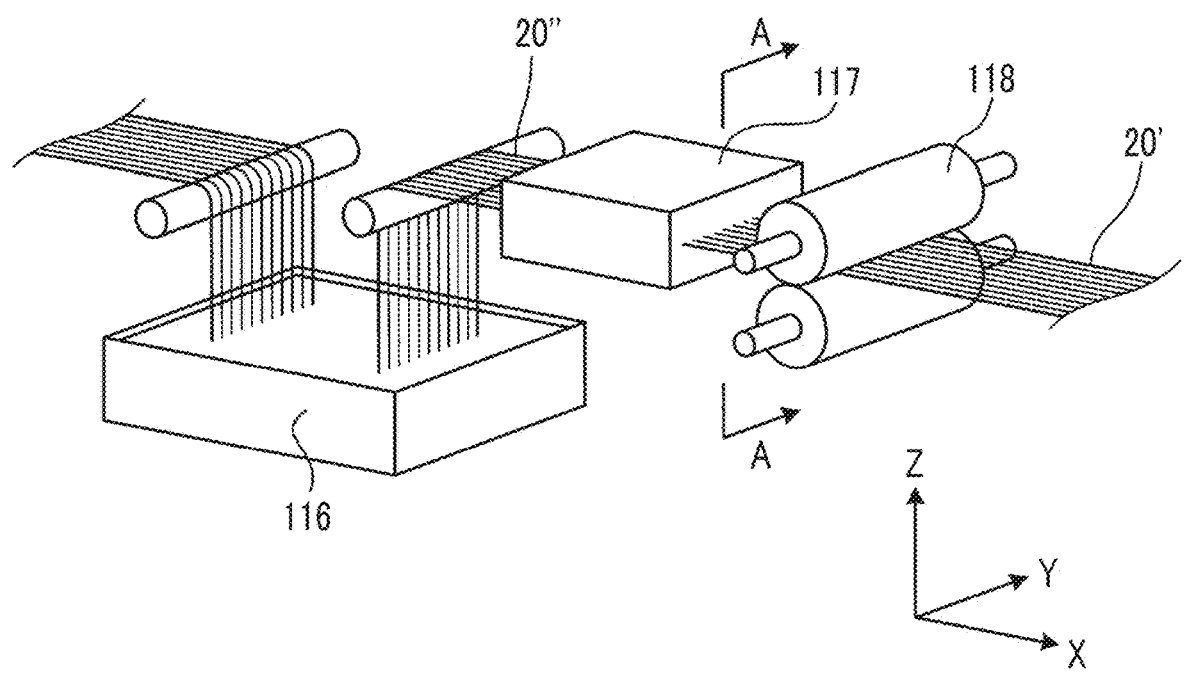
FIG. 12 is a schematic configurational view of an example of an impregnating section included in the device for producing a pultruded material of FIG. 3 and FIG. 4.
Figure 13:
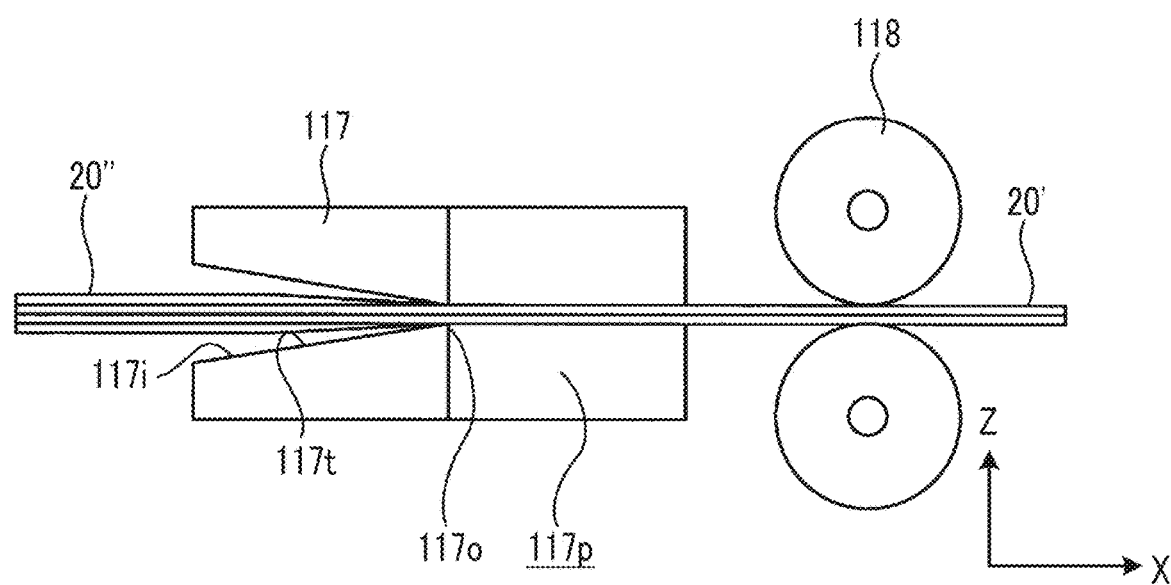
FIG. 13 is a schematic A-A cross-sectional view illustrating an example of a resin homogenization section and an example of a vacuum deaeration section included in the impregnating section of FIG. 12.

FIG. 12 is a schematic configurational view of an example of an impregnating section included in the device 100 for producing a pultruded material of FIG. 3 and FIG. 4. FIG. 13 is a schematic A-A cross-sectional view illustrating the first resin homogenization section and vacuum deaeration section 117 and the second resin homogenization section 118 which are an example of a resin homogenization section and an example of a vacuum deaeration section included in the impregnating section of FIG. 12. As illustrated in FIG. 12, the impregnating section includes the resin pool 116, the first resin homogenization section which is a part of the first resin homogenization section and vacuum deaeration section 117, and the second resin homogenization section 118. The resin pool 116 is a pool retaining the thermosetting resin 26, the bundle of the reinforced fibers 24 is immersed in the resin pool, thereby impregnating the thermosetting resin 26 into the bundle of the reinforced fibers 24 and forming the composite material base material 20 in which the reinforced fibers 24 extend in the X-axis direction.

The first resin homogenization section and vacuum deaeration section 117 includes the first resin homogenization section and the vacuum deaeration section 117p. The first resin homogenization section which is a part of the first resin homogenization section and vacuum deaeration section 117 a member having at least any of a width-direction length which is along the Y-axis direction and a thickness-direction length which is along the Z-axis direction gradually narrowed from an inlet through an outlet. In detail, as illustrated in FIG. 13, the first resin homogenization section which is a part of the first resin homogenization section and vacuum deaeration section 117 includes an inlet 117i, an outlet 117o, and a tapered inner circumferential surface 117t. The inlet 117i is an introduction opening into which the composite material base material 20" is introduced. The outlet 117o is a discharging opening from which the composite material base material 20' having a proportion of the amount of the impregnated thermosetting resin 26 in the reinforced fibers 24 set to be constant by the first resin homogenization section is discharged toward the vacuum deaeration section 117p provided immediately downstream of the first resin homogenization section. The tapered inner circumferential surface 117t is a surface having a width-direction length and a thickness-direction length both being gradually narrowed from the inlet 117i through the outlet 117o. The tapered inner circumferential surface 117t carries out a first resin homogenization treatment in which the proportion of the amount of the impregnated thermosetting resin 26 in the reinforced fibers 24 is set to be uniform by averaging the thermosetting resin 26 impregnating into the reinforced fibers 24. In the first embodiment, the tapered inner circumferential surface 117t has a width-direction length and a thickness-direction length both being uniformly narrowed, but the present invention is not limited thereto, both the width-direction length and the thickness-direction length may be unevenly narrowed, or the width-direction length and the thickness-direction length may include a constant place.

The vacuum deaeration section 117p is provided immediately downstream of the first resin homogenization section. The vacuum deaeration section 117p deaerates the thermosetting resin 26 impregnated into the reinforced fiber 24 by drawing a vacuum on the surrounding of the bundle of the reinforced fibers 24 impregnated with the thermosetting resin 26 by the impregnating section before the bundle of the reinforced fibers 24 impregnated with the thermosetting resin 26 by the impregnating section is introduced into the mold 140. Specifically, the vacuum deaeration section 117p draws a vacuum on the inside thereof, that is, sets a negative pressure than at least the external air, thereby deaerating the thermosetting resin 26 which has impregnated into the bundle of the reinforced fibers 24 which passes through the inside of the vacuum deaeration section 117p and removing voids (air bubbles) present in the thermosetting resin 26. In the first embodiment, the vacuum deaeration section 117p removes voids (air bubbles) by vacuum drawing, but the present invention is not limited thereto, and it is possible to use a void (air bubble) removing section in which any well-known void (air bubble) removing method is used.

As illustrated in FIG. 12 and FIG. 13, the second resin homogenization section 118 is provided in a place in the +X-axis direction from the first resin homogenization section and vacuum deaeration section 117, that is, downstream of the first resin homogenization section and vacuum deaeration section 117. The second resin homogenization section 118 applies tension to the bundle of the reinforced fibers 24 along the X-axis direction which is the direction in which the reinforced fibers 24 extend downstream of the first resin homogenization section included in the first resin homogenization section and vacuum deaeration section 117, thereby applying tension to the bundle of the reinforced fibers 24 which passes through the first resin homogenization section along the X-axis direction which is the direction in which the reinforced fibers 24 extend. As the second resin homogenization section 118, a pair of rollers are exemplified. The second resin homogenization section 118 sandwiches the composite material base material 20' in the thickness direction which is the Z-axis direction using a pair of rollers and sends the composite material base material 20' in the +X-axis direction, thereby applying tension along the X-axis direction which is the direction in which the reinforced fibers 24 included in the composite material base material 20' extend. In addition, the second resin homogenization section 118 carries out a second resin homogenization treatment in which the composite material base material 20' is sandwiched in the thickness direction which is the Z-axis direction using a pair of rollers and pressed in the thickness direction, and the thermosetting resin 26 included in the composite material base material 20' is averaged, thereby setting the proportion of the amount of the impregnated thermosetting resin 26 in the reinforced fibers 24 to be more uniform.

Figure 14:
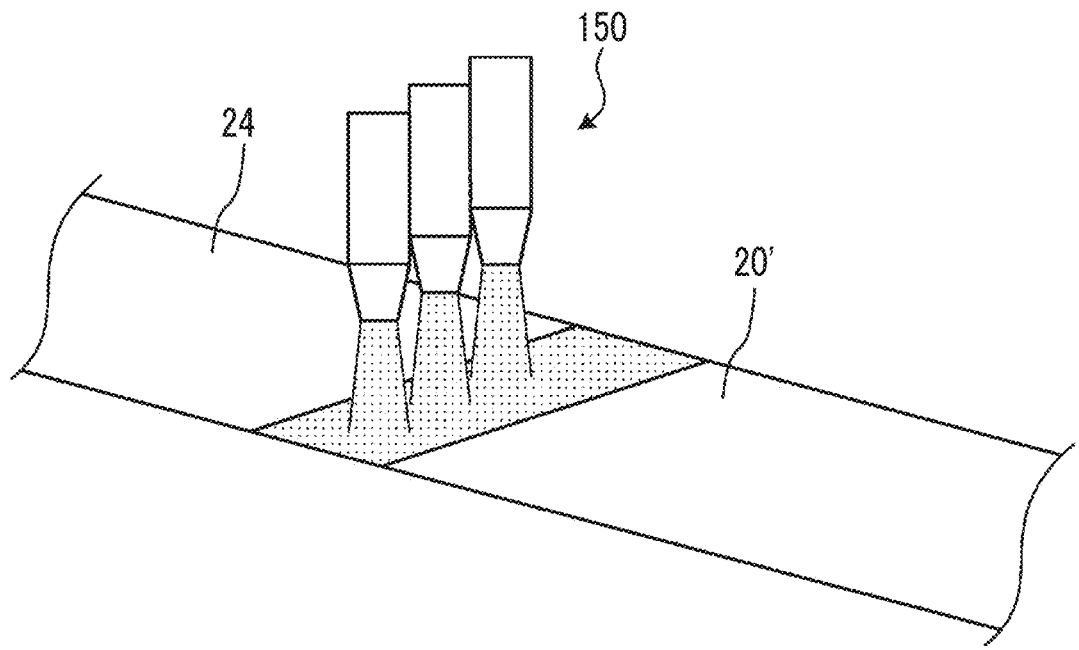
FIG. 14 is a schematic configurational view of another example of the impregnating section.

FIG. 14 is a schematic configurational view of another example of the impregnating section. In the device 100 for producing a pultruded material, an impregnating section including a resin blowing section 150 illustrated in FIG. 14 may be used instead of the impregnating section including the resin pool 116, the first resin homogenization section which is a part of the first resin homogenization section and vacuum deaeration section 117, and the second resin homogenization section 118. In the case of using the impregnating section including the resin blowing section 150, the vacuum deaeration section 117p is provided downstream of the impregnating section including the resin blowing section 150. The resin blowing section 150 uniformly applies the thermosetting resin 26 to the bundle of the reinforced fibers 24 by blowing and forms the composite material base material 20' in which the reinforced fibers 24 extend in the X-axis direction. The resin blowing section 150 may also blow a liquid including the thermosetting resin 26 to the bundle of the reinforced fibers 24.

Figure 15:
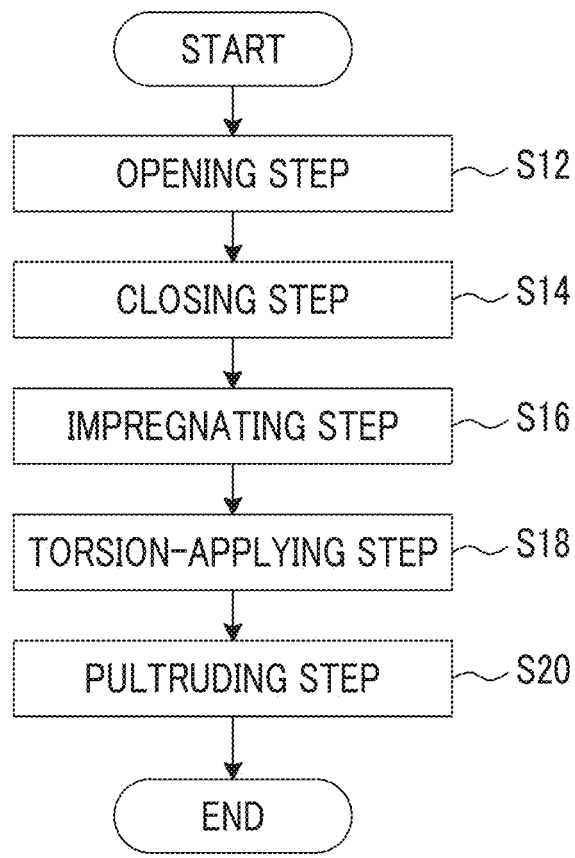
FIG. 15 is a flowchart illustrating an example of a flow of a method for producing a pultruded material according to the first embodiment.

Actions of the device 100 for producing a pultruded material according to the first embodiment of the present invention will be described below. FIG. 15 is a flowchart illustrating an example of a flow of the method for producing a pultruded material according to the first embodiment which produces the pultruded material 10 of FIG. 1. The method for producing a pultruded material according to the first embodiment of the present invention which is a treatment method being carried out by the device 100 for producing a pultruded material will be described using FIG. 15. The method for producing a pultruded material according to the first embodiment of the present invention includes an opening step S12, a closing step S14, an impregnating step S16, a tension adjustment step S18, and a pultruding step S20. In the following description, the opening step S12, the closing step S14, the impregnating step S16, the tension adjustment step S18, and the pultruding step S20 will be appropriately and simply referred to as Step S12, Step S14, Step S16, Step S18, and Step S20.

The fiber supply section 110 supplies the bundle of the reinforced fibers 24''' which serve as a source of the reinforced fibers 24 in the composite material base material 20 along the X-axis direction. The first opening section 112 carries out the first opening treatment on the bundle of the reinforced fibers 24''' supplied by the fiber supply section 110, thereby opening the bundle of the reinforced fibers 24''' to produce the bundle of the reinforced fibers 24''. Furthermore, the second opening section 113 carries out the second opening treatment, thereby opening the bundle of the reinforced fibers 24'' to produce the bundle of the reinforced fibers 24' (Step S12).

The first opening section 112, in detail, carries out a treatment including at least any treatment of a treatment for opening the bundle of the reinforced fibers 24''' by blowing the air, a treatment for opening the bundle of the reinforced fibers 24''' by applying vibrations, and a treatment for opening the bundle of the reinforced fibers 24''' by pressing the bundle of the reinforced fibers into the rod-like member, thereby opening the bundle of the reinforced fibers 24'''. In addition, the second opening section 113, in detail, carries out a treatment in which the bundle of the reinforced fibers 24'' is passed through the comb-like section having the teeth disposed in the direction intersecting the direction in which the reinforced fibers 24'' extend, for example, the vertical direction as a preferred direction, thereby further opening the bundle of the reinforced fibers 24''.

After Step S12, the closing section 114 and the tension-applying section 115 carry out a closing treatment on the reinforced fibers 24' on which the second opening treatment has been carried out using the second opening section 113, thereby closing the bundle of the reinforced fibers 24' (Step S14). In detail, the closing section 114 treats the bundle of the reinforced fibers 24' to be closed by squeezing gaps among the reinforced fibers 24' in the bundle of the reinforced fibers 24' using the tapered inner circumferential surface 114$t$. In addition, the tension-applying section 115 applies tension to the bundle of the reinforced fibers 24 using the pair of rollers along the X-axis direction which is the direction in which the reinforced fibers 24 extend downstream of the closing section 114, thereby applying tension to the bundle of the reinforced fibers 24' which passes through the closing section 114 along the X-axis direction which is the direction in which the reinforced fibers 24' extend. Therefore, the closing section 114 and the tension-applying section 115 are capable of closing the bundle of the reinforced fibers 24' while applying tension along the direction in which the reinforced fibers 24' extend.

After Step S14, the resin pool 116, the first resin homogenization section and vacuum deaeration section 117, and the second resin homogenization section 118 uniformly impregnates the thermosetting resin 26 into the bundle of the reinforced fibers 24 on which the closing treatment has been carried out by the closing section 114 and the tension-applying section 115, thereby producing the composite material base material 20' (Step S16). In detail, the bundle of the reinforced fibers 24 is immersed in the resin pool 116, thereby impregnating the thermosetting resin 26 into the bundle of the reinforced fibers 24 and forming the composite material base material 20'' in which the reinforced fibers 24 extend in the X-axis direction. The first resin homogenization section included in the first resin homogenization section and vacuum deaeration section 117 and the second resin homogenization section 118 uniform the thermosetting resin 26 included in the composite material base material 20'', that is, sets the proportion of the amount of the impregnated thermosetting resin 26 in the reinforced fibers 24 to be uniform. In more detail, the first resin homogenization section carries out a first resin homogenization treatment in which the proportion of the amount of the impregnated thermosetting resin 26 in the reinforced fibers 24 is set to be uniform by averaging the thermosetting resin 26 impregnating into the reinforced fibers 24 using the tapered inner circumferential surface 117$t$. The second resin homogenization section 118 applies tension to the bundle of the reinforced fibers 24 using the pair of rollers along the X-axis direction which is the direction in which the reinforced fibers 24 extend downstream of the first resin homogenization section, thereby applying tension to the bundle of the reinforced fibers 24 which passes through the first resin homogenization section along the X-axis direction which is the direction in which the reinforced fibers 24 extend. The second resin homogenization section 118 carries out the second resin homogenization treatment in which the composite material base material 20' is sandwiched in the thickness direction which is the Z-axis direction using the pair of rollers and pressed in the thickness direction, and the thermosetting resin 26 included in the composite material base material 20' is averaged, thereby setting the proportion of the amount of the impregnated thermosetting resin 26 in the reinforced fibers 24 to be more uniform.

The method for producing a pultruded material according to the first embodiment of the present invention preferably further includes a vacuum deaeration step of deaerating the thermosetting resin 26 by drawing a vacuum on the surrounding of the bundle of the reinforced fibers 24 before the pultruding step S20 is carried out on the bundle of the reinforced fibers 24 impregnated with the thermosetting resin 26 in the impregnating step S16. The first resin homogenization section and the vacuum deaeration section 117$p$ included in the vacuum deaeration section 117 carry out a vacuum deaeration step of drawing a vacuum on the inside thereof, that is, setting a negative pressure than at least the external air, thereby deaerating the thermosetting resin 26 which has impregnated into the bundle of the reinforced fibers 24 which passes through the inside of the vacuum deaeration section 117$p$ and removing voids (air bubbles) present in the thermosetting resin 26.

In addition, the composite material base material 20' may also be produced by uniformly impregnating the thermosetting resin 26 into the bundle of the reinforced fibers 24 on which the closing treatment has been carried out using the closing section 114 and the tension-applying section 115 using the resin blowing section 150 instead of the resin pool 116, the first resin homogenization section, and the second resin homogenization section 118 (Step S16). In detail, the resin blowing section 150 uniformly applies the thermosetting resin 26 to the bundle of the reinforced fibers 24 by blowing and forms the composite material base material 20' in which the reinforced fibers 24 extend in the X-axis direction. Even in a case in which the impregnating step S16 is carried out using the resin blowing section 150, a vacuum deaeration step using the vacuum deaeration section 117$p$ provided downstream of the resin blowing section 150 is preferably further included.

After Step S16, the molding roller 119 deforms a plurality of sheets of the composite material base material 20' formed in Step S16 so as to have a predetermined shape in a plane perpendicular to a longitudinal direction and transports the composite material base material in the longitudinal direction toward the tension adjustment section 130. For example, the molding roller 119 bends the composite material base material 20$a$' and the composite material base material 20$b$' along the X-axis direction at a predetermined place, thereby deforming the composite material base materials so that a T shape is formed in a plurality of the composite material base materials 20'.

It is preferable that, in association with the treatments from Step S12 to Step S16, the indirect base material 22" is supplied using the gap base material supply section 120, the indirect base material 22" is immersed in the resin pool 122, thereby impregnating the thermosetting resin into the indirect base material 22" to form the gap material 22', the gap material 22' is disposed in gaps among the plurality of sheets of the composite material base material 20' and the gap material is transported in the longitudinal direction toward the tension adjustment section 130 together with the plurality of sheets of the composite material base materials 20'. The device and the method for producing a pultruded material according to the first embodiment are capable of producing the pultruded material 10 in which gaps in a composite material molded body are preferably filled with the gap material 22 in a case in which the gap material 22' is disposed in the gaps among the plurality of sheets of the composite material base material 20'.

The tension adjustment section 130 applies tension to the composite material base material 20' and the gap material 22' along the direction in which the reinforced fibers 24 extend, that is, the X-axis direction before the composite material base material 20' molded by the molding roller 119 and the gap material 22' being transported from the gap base material supply section 120 and the resin pool 122 are introduced into the mold 140. The tension adjustment section 130 applies tension to the composite material base material 20' and the gap material 22' along the direction in which the reinforced fibers 24 extend before the composite material base material and the gap material are introduced into the mold 140, thereby adjusting the tension applied to the composite material base material 20' and the gap material 22' in the direction in which the reinforced fibers 24 extend during the introduction into the mold 140 (Step S18).

The composite material base material 20' and the gap material 22' for which the tension being applied in the direction in which the reinforced fibers 24 extend is adjusted using the tension adjustment section 130 are introduced into the mold 140. The mold 140 pultrudes the composite material base material 20' and the gap material 22' that are introduced from the respective series of devices (Step S20).

It is preferable that the mold 140 has a heating section and causes the thermosetting resin 26 and the like included in the composite material base material 20' and the gap material 22' to be in the semi-cured state or the cured state. Alternatively, it is preferable that the mold has heating sections respectively between the resin pool 116 and the mold 140 and between the resin pool 122 and the mold 140 and causes the thermosetting resin 26 and the like included in the composite material base material 20' and the gap material 22' to be in the semi-cured state or the cured state using the heating sections.

In the device and the method for producing a pultruded material according to the first embodiment, the bundle of the reinforced fibers 24' sufficiently opened in the opening step is closed by narrowing at least any of the width-direction length and the thickness-direction length under the application of tension along the direction in which the reinforced fibers 24 extend, and thus it is possible to improve the straightness of the reinforced fibers 24 and improve the homogeneity of the thermosetting resin 26 being impregnated into the reinforced fibers 24 in the subsequent impregnating step.

In addition, in the device and the method for producing a pultruded material according to the first embodiment, the impregnating method using the impregnating section includes the first resin homogenization step and the second resin homogenization step using the first resin homogenization section included in the first resin homogenization section and vacuum deaeration section 117 and the second resin homogenization section 118 or the resin blowing step using the resin blowing section 150, and thus it is possible to improve the homogeneity of the thermosetting resin 26 being impregnated into the reinforced fibers 24 in the impregnating step.

In addition, the device and the method for producing a pultruded material according to the first embodiment further include the vacuum deaeration step using the vacuum deaeration section 117p included in the first resin homogenization section and vacuum deaeration section 117, and thus it is possible to remove voids (air bubbles) in the thermosetting resin 26 being impregnated into the bundle of the reinforced fibers 24 and further improving the internal quality of the pultruded material 10.

Meanwhile, in the device and the method for producing a pultruded material according to the first embodiment, the first opening step, the second opening step, and the closing step using the first opening section 112, the second opening section 113, the closing section 114, and the tension-applying section 115 and the impregnating step using the resin pool 116, the first resin homogenization section included in the first resin homogenization section and vacuum deaeration section 117, and the second resin homogenization section 118 may be switched with each other. In this case, the first opening step, the second opening step, and the closing step are carried out on the reinforced fibers 24 impregnated with the thermosetting resin 26, thereby improving the straightness of the reinforced fibers 24 and improving the homogeneity of the thermosetting resin 26.

Second Embodiment

Figure 16:
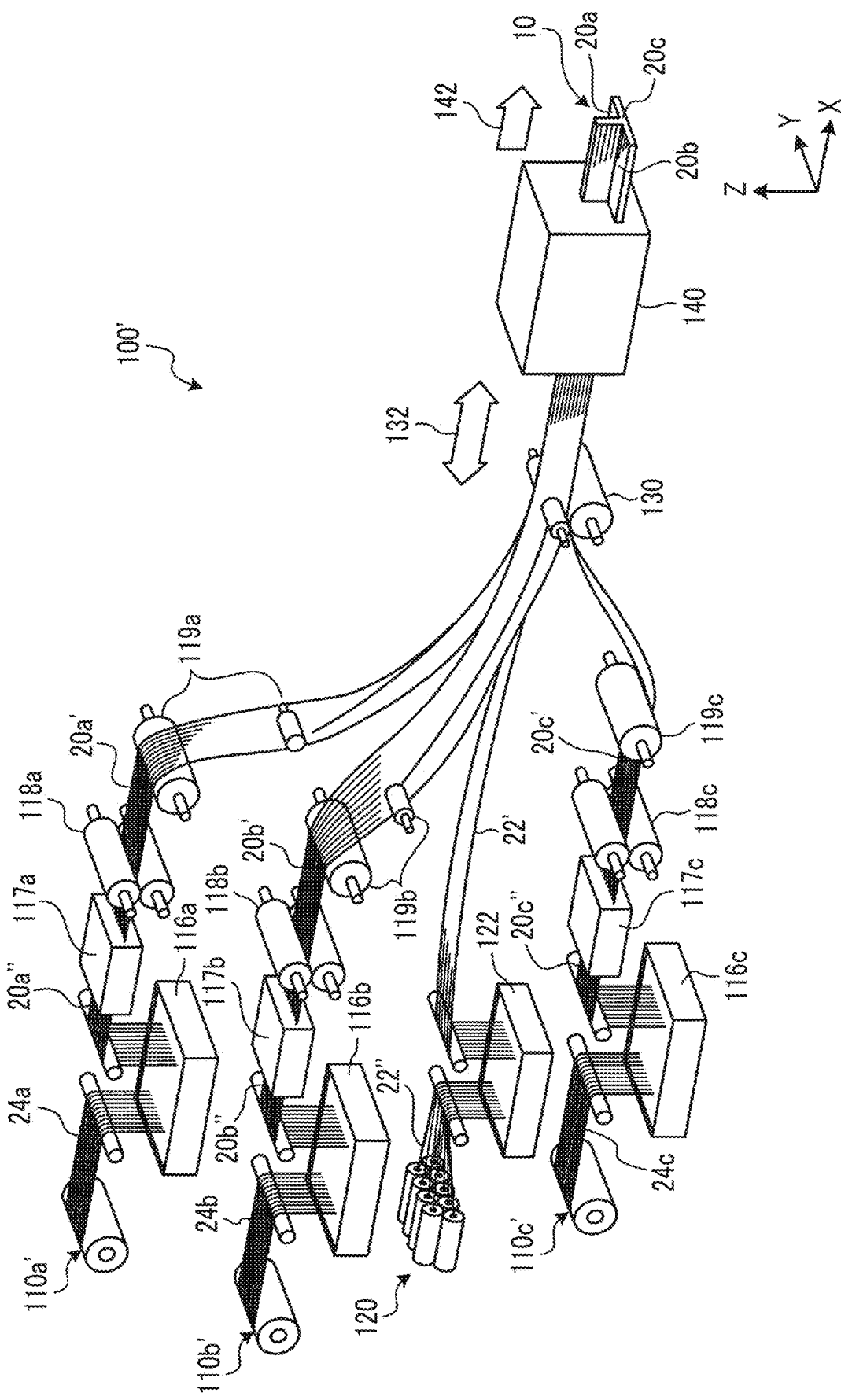
FIG. 16 is a schematic configurational view of an example of a device for producing a pultruded material according to a second embodiment.
Figure 17:
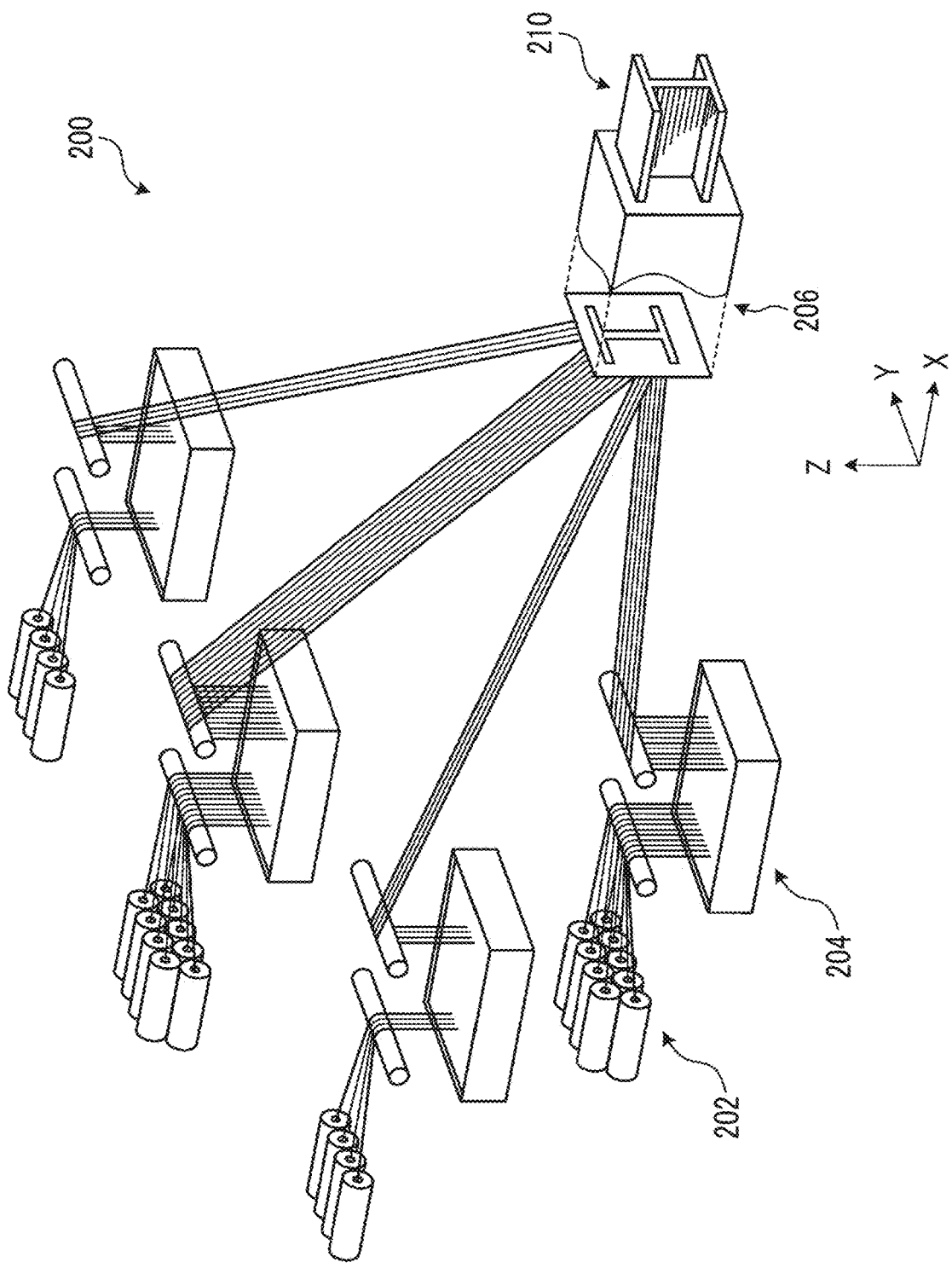
FIG. 17 is a schematic configurational view of a device for producing a pultruded material of the related art.
Figure 18:
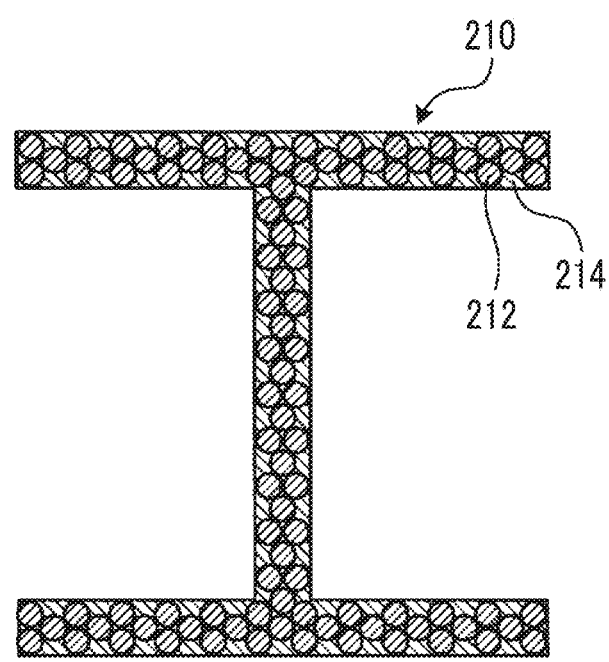
FIG. 18 is a schematic cross-sectional view of a pultruded material that is produced using the device for producing a pultruded material of the related art.

FIG. 16 is a schematic configurational view of a device 100' for producing a pultruded material which is an example of a device for producing a pultruded material according to a second embodiment. The device 100' for producing a pultruded material according to the second embodiment is the device 100 for producing a pultruded material according to the first embodiment in which, as illustrated in FIG. 16, the fiber supply section 110a, the first opening section 112a, the second opening section 113a, the closing section 114a, and the tension-applying section 115a are changed to a preform supply section 110a', the fiber supply section 110b, the first opening section 112b, the second opening section 113b, the closing section 114b, and the tension-applying section 115b are changed to a preform supply section 110b', and the fiber supply section 110c, the first opening section 112c, the second opening section 113c, the closing section 114c, and the tension-applying section 115c are changed to a preform supply section 110c'. In the description of the second embodiment, the same configuration as in the first embodiment will be indicated using the same reference sign as in the first embodiment and will not be described in detail. Hereinafter, in the case of being not differentiated from one another, the preform supply sections 110a', 110b', and 110c' will be appropriately referred to as the preform supply sections 110'.

The preform supply sections 110a' supplies a preform that is a sheet of the reinforced fiber 24a which serves as a source of the reinforced fiber 24a in the composite material base material 20a. The preform supply sections 110b' supplies a preform that is a sheet of the reinforced fiber 24b which serves as a source of the reinforced fiber 24b in the composite material base material 20b. The preform supply sections 110c' supplies a preform that is a sheet of the reinforced fiber 24c which serves as a source of the reinforced fiber 24c in the composite material base material 20c. Here, the preform refers to a composite material base material into which no thermosetting resin is impregnated. The preform is immersed in the resin pool 116, and the thermosetting resin 26 is impregnated into the reinforced fiber 24 included in the preform, thereby forming the composite material base material 20".

Actions of the device 100' for producing a pultruded material according to the second embodiment of the present invention will be described below. The method for producing a pultruded material according to the second embodiment of the present invention which is a treatment method being carried out by the device 100' for producing a pultruded material will be described. The method for producing a pultruded material according to the second embodiment of the present invention is the method for producing a pultruded material according to the first embodiment in which the opening step S12 and the closing step S14 are not included and the impregnating step S16 is changed.

The resin pool 116, the first resin homogenization section included in the first resin homogenization section and vacuum deaeration section 117, and the second resin homogenization section 118 uniformly impregnates the thermosetting resin 26 into the preform supplied by the preform supply section 110', thereby producing the composite material base material 20' (Step S16). In detail, the preform is immersed in the resin pool 116, thereby impregnating the thermosetting resin 26 into the reinforced fiber 24 included in the preform and forming the composite material base material 20" in which the reinforced fiber 24 extends in the X-axis direction. Similar to the first embodiment, the first resin homogenization section included in the first resin homogenization section and vacuum deaeration section 117 and the second resin homogenization section 118 uniform the thermosetting resin 26 included in the composite material base material 20", that is, sets the proportion of the amount of the impregnated thermosetting resin 26 in the reinforced fiber 24 to be uniform. The vacuum deaeration section 117p included in the first resin homogenization section and vacuum deaeration section 117 carries out the vacuum deaeration step in the same manner as in the first embodiment.

In addition, in the second embodiment as well, similar to the first embodiment, the composite material base material 20' may be produced by uniformly impregnating the thermosetting resin 26 into the preform supplied by the preform supply section 110' using the resin blowing section 150 instead of the resin pool 116, the first resin homogenization section included in the first resin homogenization section and vacuum deaeration section 117, and the second resin homogenization section 118 (Step S16). In detail, the resin blowing section 150 uniformly applies the thermosetting resin 26 to the preform including the reinforced fiber 24 by blowing and forms the composite material base material 20' in which the reinforced fiber 24 extends in the X-axis direction. Even in a case in which the impregnating step S16 is carried out using the resin blowing section 150, similar to the first embodiment, the vacuum deaeration step using the vacuum deaeration section 117p provided downstream of the resin blowing section 150 is preferably further included.

In the device and the method for producing a pultruded material according to the second embodiment, the proportion of the thermosetting resin 26 being impregnated into the reinforced fiber 24 using the impregnating section is set to be constant even after the reinforced fiber 24 is worked to a sheet shape, and thus it is possible to improve the homogeneity of the thermosetting resin 26 being impregnated into the reinforced fiber 24.

REFERENCE SIGNS LIST

10 PULTRUDED MATERIAL
20, 20', 20", 20a, 20a', 20a", 20b, 20b', 20b", 20c, 20c', 20c'" COMPOSITE MATERIAL BASE MATERIAL
22, 22' GAP MATERIAL
22" INDIRECT BASE MATERIAL
24, 24', 24", 24'", 24a, 24a', 24a", 24a'", 24b, 24b', 24b", 24b'", 24c, 24c', 24c", 24c'" REINFORCED FIBER
26, 26a, 26b, 26c THERMOSETTING RESIN
30a, 30b, 30c, 40, 50, 60 BUNDLE OF REINFORCED FIBERS
100, 100' DEVICE FOR PRODUCING PULTRUDED MATERIAL
110, 110a, 110b, 110c FIBER SUPPLY SECTION
110', 110a', 110b', 110c' PREFORM SUPPLY SECTION
112, 112a, 112b, 112c FIRST OPENING SECTION
113, 113a, 113b, 113c SECOND OPENING SECTION
114, 114a, 114b, 114c CLOSING SECTION
114i, 117i INLET
114o, 117o OUTLET
114t, 117t TAPERED INNER CIRCUMFERENTIAL SURFACE
115, 115a, 115b, 115c TENSION-APPLYING SECTION
116, 116a, 116b, 116c, 122 RESIN POOL
117, 117a, 117b, 117c FIRST RESIN HOMOGENIZATION SECTION AND VACUUM DEAERATION SECTION
117p VACUUM DEAERATION SECTION
118, 118a, 118b, 118c SECOND RESIN HOMOGENIZATION SECTION
119, 119a, 119b, 119c MOLDING ROLLER
120 GAP BASE MATERIAL SUPPLY SECTION
130 TENSION ADJUSTMENT SECTION
132, 142 ARROW
140 MOLD

The invention claimed is:

1. A method for producing a pultruded material obtained by impregnating a thermosetting resin into reinforced fibers, the method comprising:
  an opening step of opening a bundle of the reinforced fibers having no irregularity in each tow of the reinforced fibers and no irregularity among all tows of the reinforced fibers;
  a closing step of closing the bundle of the reinforced fibers opened in the opening step by introducing the bundle of the reinforced fibers into a member having an inner circumferential surface having a width-direction length and a thickness-direction length which are both gradually narrowed from an inlet of the member through an outlet of the member under application of tension along a direction in which the reinforced fibers extend;
  an impregnating step of impregnating the thermosetting resin into the bundle of the reinforced fibers closed in the closing step; and
  a pultruding step of forming a pultruded material by pultruding the bundle of the reinforced fibers impregnated with the thermosetting resin in the impregnating step along the direction in which the reinforced fibers extend, wherein the opening step includes
a first opening step of opening the bundle of the reinforced fibers, and
a second opening step of further opening the bundle of the reinforced fibers opened by the first opening step, and
in the second opening step, the bundle of the reinforced fibers is further opened by blowing of air.

2. The method for producing a pultruded material according to claim 1,
wherein, in the first opening step, the bundle of the reinforced fibers is opened by at least any treatment of blowing of air, application of vibrations, and pressing of the bundle of the reinforced fibers into a rod-like member.

3. The method for producing a pultruded material according to claim 1,
wherein, in the impregnating step, the bundle of the reinforced fibers is immersed in a resin pool filled with the thermosetting resin, and then a proportion of an amount of the impregnated thermosetting resin in the reinforced fibers is set to be constant under application of tension along the direction in which the reinforced fibers extend.

4. The method for producing a pultruded material according to claim 1,
wherein, in the impregnating step, the thermosetting resin is uniformly applied to the bundle of the reinforced fibers by blowing.

5. The method for producing a pultruded material according to claim 1, further comprising:
a vacuum deaeration step of deaerating the thermosetting resin by drawing a vacuum on a surrounding of the bundle of the reinforced fibers before the pultruding step is carried out on the bundle of the reinforced fibers impregnated with the thermosetting resin in the impregnating step.

6. The method for producing a pultruded material according to claim 1, further comprising:
a tension adjustment step of adjusting tension by applying the tension along the direction in which the reinforced fibers extend before the pultruding step is carried out on the bundle of the reinforced fibers impregnated with the thermosetting resin in the impregnating step.

\* \* \* \* \*